United States Patent
Takano

(10) Patent No.: US 9,571,244 B2
(45) Date of Patent: Feb. 14, 2017

(54) WIRELESS COMMUNICATION APPARATUS, WIRELESS COMMUNICATION METHOD, AND WIRELESS COMMUNICATION SYSTEM

(71) Applicant: Sony Corporation, Tokyo (JP)

(72) Inventor: Hiroaki Takano, Saitama (JP)

(73) Assignee: Sony Corporation (JP)

(*) Notice: Subject to any disclaimer, the term of this patent is extended or adjusted under 35 U.S.C. 154(b) by 146 days.

(21) Appl. No.: 14/372,855

(22) PCT Filed: Nov. 2, 2012

(86) PCT No.: PCT/JP2012/078450
§ 371 (c)(1),
(2) Date: Jul. 17, 2014

(87) PCT Pub. No.: WO2013/111412
PCT Pub. Date: Aug. 1, 2013

(65) Prior Publication Data
US 2015/0009924 A1 Jan. 8, 2015

(30) Foreign Application Priority Data

Jan. 26, 2012 (JP) ................................ 2012-013746
Mar. 9, 2012 (JP) ................................ 2012-053542

(51) Int. Cl.
*H04B 7/06* (2006.01)
*H04L 5/00* (2006.01)
(Continued)

(52) U.S. Cl.
CPC ............ *H04L 5/0035* (2013.01); *H04B 7/024* (2013.01); *H04B 7/065* (2013.01); *H04L 5/006* (2013.01);
(Continued)

(58) Field of Classification Search
None
See application file for complete search history.

(56) References Cited

U.S. PATENT DOCUMENTS

2010/0113078 A1* 5/2010 Farajidana ............. H04B 7/024
455/507
2011/0268007 A1* 11/2011 Barany .................. H04B 7/024
370/312
(Continued)

FOREIGN PATENT DOCUMENTS

JP 2010-258612 A 11/2010
JP 2011-061728 A 3/2011
(Continued)

OTHER PUBLICATIONS

Sony Corporation, Subband based CoMP feedback for DPS, 3GPP TSG RAN WG1 #68-bis R1-121128, Mar. 30, 2012.
(Continued)

*Primary Examiner* — Chi H Pham
*Assistant Examiner* — Vladislav Agureyev
(74) *Attorney, Agent, or Firm* — Lerner, David, Littenberg, Krumholz & Mentlik, LLP

(57) ABSTRACT

An overhead accompanying feedback from a UE terminal is reduced.
The UE terminal selects not only M subbands with high quality but also M subbands with poor quality. Alternatively, the UE terminal selects M subbands to be fed back by increasing a priority of a subband with a high degree to which the quality of the subband is to be improved by the feedback or a subband having a high possibility of unnecessary eNodeB being removed from the CoMP set by the feedback. In addition, the UE terminal performs measurement and feedback in units of subband groups which can be collectively handled.

4 Claims, 15 Drawing Sheets

(51) Int. Cl.
*H04W 24/10* (2009.01)
*H04W 72/06* (2009.01)
*H04B 7/02* (2006.01)

(52) U.S. Cl.
CPC ............. *H04W 24/10* (2013.01); *H04W 72/06* (2013.01); *H04B 7/063* (2013.01); *H04B 7/066* (2013.01); *H04B 7/0639* (2013.01); *H04L 5/0048* (2013.01); *H04L 5/0053* (2013.01)

(56) References Cited

U.S. PATENT DOCUMENTS

| | | | | |
|---|---|---|---|---|
| 2012/0008522 | A1* | 1/2012 | Ng | H04L 1/0026 370/252 |
| 2012/0014272 | A1* | 1/2012 | Zhou | H04L 5/0035 370/252 |
| 2012/0020230 | A1* | 1/2012 | Chen | H04L 1/0028 370/252 |
| 2012/0051250 | A1* | 3/2012 | Sun | H04L 41/5032 370/252 |
| 2012/0076038 | A1 | 3/2012 | Shan et al. | |
| 2012/0140694 | A1 | 6/2012 | Sun et al. | |
| 2012/0172076 | A1 | 7/2012 | Seki | |
| 2012/0208547 | A1* | 8/2012 | Geirhofer | H04B 7/0626 455/452.2 |
| 2012/0218962 | A1 | 8/2012 | Kishiyama et al. | |
| 2012/0218968 | A1* | 8/2012 | Kim | H04L 5/0053 370/329 |
| 2012/0257515 | A1* | 10/2012 | Hugl | H04W 24/10 370/252 |
| 2012/0282966 | A1* | 11/2012 | Koo | H04L 1/0026 455/517 |
| 2013/0003788 | A1* | 1/2013 | Marinier | H04B 7/024 375/219 |
| 2013/0021925 | A1* | 1/2013 | Yin | H04B 7/024 370/252 |
| 2013/0021926 | A1* | 1/2013 | Geirhofer | H04L 5/0048 370/252 |
| 2013/0039349 | A1* | 2/2013 | Ebrahimi Tazeh Mahalleh | H04L 1/0013 370/336 |
| 2013/0053078 | A1* | 2/2013 | Barbieri | H04B 7/024 455/509 |
| 2013/0077514 | A1* | 3/2013 | Dinan | H04L 5/0057 370/252 |
| 2013/0083681 | A1* | 4/2013 | Ebrahimi Tazeh Mahalleh | H04L 5/0057 370/252 |
| 2013/0114656 | A1* | 5/2013 | Sayana | H04B 7/024 375/219 |
| 2013/0163461 | A1* | 6/2013 | Kim | H04B 7/0626 370/252 |
| 2013/0301450 | A1* | 11/2013 | Geirhofer | H04B 7/024 370/252 |

FOREIGN PATENT DOCUMENTS

| | | | |
|---|---|---|---|
| JP | 2011-082709 A | 4/2011 | |
| JP | 2011-193441 A | 9/2011 | |
| KR | WO 2011055940 A2 * | 5/2011 | ............ H04B 7/024 |
| WO | 2010134792 A2 | 11/2010 | |
| WO | 2011017968 A1 | 2/2011 | |

OTHER PUBLICATIONS

Pantech, Feedback issues for Macro site CoMP, 3GPP TSG RAN Working Group 1 Meeting #64 R1-110756, Feb. 25, 2011.
China Telecom, ZTE, Consideration on CSI feedback for CoMP, TSG-RAN WG1 Meeting #67 R1-114017, Nov. 18, 2011.
Huawei, HiSilicon, Performance evaluation of DL CoMP in scenario4, 3GPP TSG RAN WG1 meeting #65 R1-111249, May 13, 2011.
International Search Report from International Publication PCT/JP2012/078450 mailed Dec. 25, 2012.
Nguyen, Hung Tuan, et al., "Feedback Compression Schemes for Downlink Carrier Aggregation in LTE-Advanced," IEEE (2011).
Extended European Search Report for EP 12866795.3 Dated Dec. 22, 2015.

* cited by examiner

US 9,571,244 B2

WIRELESS COMMUNICATION APPARATUS, WIRELESS COMMUNICATION METHOD, AND WIRELESS COMMUNICATION SYSTEM

CROSS-REFERENCE TO RELATED APPLICATION

The present application is a national phase entry under 35 U.S.C. §371 of International Application No. PCT/JP2012/078450 filed Nov. 2, 2012, published on Aug. 1, 2013 as WO 2013/111412 A1, which claims priority from Japanese Patent Application Nos. JP 2012-013746, filed in the Japanese Patent Office on Jan. 26, 2012, and JP 2012-053542, filed in the Japanese Patent Office on Mar. 9, 2012.

TECHNICAL FIELD

The technology disclosed in the present specification relates to a wireless communication apparatus, a wireless communication method, and a wireless communication system, which simultaneously transmit and receive data to and from a terminal in cooperation with other base stations, and in particular, relates to a wireless communication apparatus, a wireless communication method, and a wireless communication system, which determine a combination of the base stations with respect to the terminal based on feedback from the terminal that receives reference signals.

BACKGROUND ART

Nowadays, the Third Generation Partnership Project (3GPP) is performing standardization work for a fourth generation mobile communication system. "Long Term Evolution (LTE)" that is one of data communication specifications developed by the 3GPP is a long-term advanced system aimed at the fourth generation (4G) IMT-Advanced and is also referred to as "3.9G (super 3G)".

In LTE, it is possible to select two types of duplex scheme: Frequency Division Duplex (FDD) and Time Division Duplex (TDD). The FDD uses an uplink dedicated region and a downlink dedicated region. In each of an uplink and a downlink, a format of a radio frame which is configured with ten consecutive subframes is used. The uplink referred to herein is communication from a terminal station (UE terminal: User Equipment) to a base station (eNodeB: evolved NodeB) of LTE, and the downlink is communication from the eNodeB to the UE terminal. Also in the TDD, a format of a radio frame configured with ten consecutive subframes is used. However, the communication is performed using the same bandwidth in the uplink and the downlink in the TDD. Respective subframes constituting the radio frame are configured with Phy Downlink Control Channels (PDCCHs) used for control signals from the eNodeB and Phy Downlink Shared Channels (PDSCH) used for user data.

In specification developing work of Release 11 of LTE by the 3GPP, Coordinated Multi Point Transmission/Reception (CoMP) works as a key technology to improve a throughput of the UE terminal located in a cell edge. CoMP is a technology intended to increase power of a desired signal and to reduce interference from other cells, by a plurality of eNodeBs simultaneously transmitting and receiving data to and from a single UE terminal. In order to efficiently draw a micro diversity gain by CoMP, it is necessary to consider a pre-coding, a reference signal, and a measurement and feedback method. In Release 8 of LTE, a scheme of stratifying various sizes of cells such as Macro/Micro/Pico/Femto termed HetNet has been considered, but CoMP includes communication with such a femto cell. In addition, CoMP includes UpLink CoMP and DownLink CoMP and UpLink CoMP is an important technology similar to DownLink CoMP, but CoMP will be described as DownLink CoMP in the following description unless otherwise described.

A method of a cell for realizing CoMP includes a scheme in which a plurality of eNodeBs respectively perform autonomous distribution control, and a scheme in which one Macro eNodeB intensively controls a plurality of Pico eNodeBs. In the latter intensive control scheme, a plurality of base stations such as Remote Radio Heads (RRHs) as a measure for non-sensing in cell edges and the like are disposed, and the Macro eNodeB which intensively controls the base stations are connected with the base stations by baseband signals using an optical fiber (described later). Then, the Macro eNodeB collectively performs inter-cell radio resource control which performs a baseband signal process and control of respective RRHs.

With Respect to Determination of CoMP Set

A combination of eNodeBs performing CoMP for a certain one UE terminal, that is, constituting a cooperative group is referred to as a Set of CoMP transmission points, or, in short, a CoMP set, hereinafter.

In order to determine the CoMP set, it is necessary to determine which eNodeBs are effective for use, with respect to the UE terminal. This is referred to as a CoMP set determination or a point selection.

As a method of the point selection, there is a method in which the UE terminal receives reference signals from respective base stations and measures Reference Signal Received Power (RSRP) for the respective base stations so as to select eNodeBs with higher power as the CoMP set.

For example, a cooperative group setting method has been proposed in which a base station transmits a cooperative group setting signaling, to which Cell IDs of cells in a cooperative group selected for the user terminal are attached, to the user terminal, and the user terminal performs a cooperative group setting using the Cell IDs, which are attached to the cooperative group setting signaling, of the cells in the cooperative group selected for the terminal (for example, see PTL 1).

Further, a wireless communication method has been proposed in which the base station respectively assigns a portion of all frequency bandwidths to bandwidths respectively used in transmission by a single base station (first transmission scheme) and transmission by a plurality of base stations (second transmission scheme), and determines which transmission scheme is to be used based on feedback information indicating a reception quality which is received by either one, in other words, reduces a feedback information amount by limiting the feedback information to information indicating the reception quality of a portion of all frequency bandwidths (for example, see PTL 2).

Further, a wireless communication system has been proposed in which respective base station apparatuses receive quality information indicating communication qualities between a target terminal apparatus and base station apparatuses which can communicate with the target terminal apparatus from the target terminal apparatus and acquire schedule information indicating communication schedules between the base station apparatuses and terminal apparatuses present within cells of other base station apparatuses so as to select some base station apparatuses functioning as the base stations for the target terminal apparatus based on the quality information and the schedule information (for example, see PTL 3).

Request for Frequency of Point Selection

It is necessary to perform the point selection at each of regular time intervals (in other words, it is necessary to update the CoMP set at each of regular time intervals). In other words, there is a problem of updating semi-statically or dynamically the CoMP set of the UE terminals. In terms of the movement of the UE terminal, a dynamic point selection which dynamically updates the CoMP set is desirable.

Basic Matters to be Considered in Dynamic Point Selection

When the dynamic point selection is performed, it is necessary to consider a decrease in a throughput generated by the reference signal occupying a communication sequence within a system, in other words, an overhead of the downlink due to reference signals.

Further, it is necessary to consider an increase in power consumption of the UE terminal by the UE terminal frequently performing the measurement of the reference signals and the like.

Furthermore, it is necessary to consider an increase in the overhead of the uplink, due to the UE terminal feeding back the measurement results of the reference signals to the eNodeB.

CITATION LIST

Patent Literature

PTL 1: Japanese Unexamined Patent Application Publication No. 2011-193441
PTL 2: Japanese Unexamined Patent Application Publication No. 2011-61728
PTL 3: Japanese Unexamined Patent Application Publication No. 2010-258612

SUMMARY OF INVENTION

Technical Problem

An object of a technology disclosed in the present specification is to provide a wireless communication apparatus, a wireless communication method, and a wireless communication system, which are excellent and capable of suitably performing a dynamic point selection based on feedback transmitted from a UE terminal which receives a reference signal, by applying a CoMP technology.

Another object of a technology disclosed in the present specification is to provide a wireless communication apparatus, a wireless communication method, and a wireless communication system, which are excellent and capable of improving an update frequency of a point selection while reducing an overhead accompanying the feedback transmitted from the UE terminal.

Solution to Problem

The present disclosure has been made in view of the above problems, and the technology according to the present disclosure is a wireless communication apparatus including a reference signal measurement unit that performs measurement of reference signals transmitted from respective base stations in a wideband and respective subbands, under a communication environment in which an entire system bandwidth is used as the wideband and a plurality of subbands obtained by dividing the system bandwidth are used; a measurement result selection unit that selects measurement results to be fed back in order to determine a cooperative group of the base stations which performs Coordinated Multi Point Transmission/Reception (CoMP) for its own apparatus, among measurement results obtained in the wideband and the respective subbands by the reference signal measurement unit; and a feedback unit that feeds back the measurement results selected by the measurement result selection unit to the base station.

According to the technology of the present disclosure, the wireless communication apparatus further includes a measurement object determination unit that selects a base station which is in use as a transmission point of the cooperative group or is a candidate for the transmission point, as a measurement object, for each wideband and subband. Then, the reference signal measurement unit is configured to perform measurement of a reference signal from the base station selected by the measurement object determination unit in the wideband and the respective subbands.

According to the technology of the present disclosure, the measurement result selection unit of the wireless communication apparatus is configured to select the measurement results to be fed back in order to determine the cooperative group such that a set of measurement results of the base station in the wideband is a population and a set of measurement results in the respective subbands is a subset for the population.

According to the technology of the present disclosure, the measurement result selection unit of the wireless communication apparatus is configured to select the measurement results to be fed back in order to determine the cooperative group, so as to include the measurement results of base stations other than the set of the measurement results in the respective subbands, in addition to the set of the measurement results of the base station in the wideband.

According to the technology of the present disclosure, the measurement result selection unit of the wireless communication apparatus is configured to select the measurement results to be fed back in order to determine the cooperative group, so as to include a measurement result of a base station added to a combination of base stations of the set of the measurement results in the respective subbands, in addition to the set of the measurement results of the base station in the wideband.

According to the technology of the present disclosure, the measurement result selection unit of the wireless communication apparatus is configured to preferentially select a measurement result of a subband having a high possibility of the cooperative group being updated when the measurement result is fed back.

According to the technology of the present disclosure, the measurement result selection unit of the wireless communication apparatus is configured to preferentially select a measurement result of a subband having a high possibility of a new base station being added to the cooperative group when the measurement result is fed back.

According to the technology of the present disclosure, the measurement result selection unit of the wireless communication apparatus is configured to preferentially select a measurement result of a subband having a high possibility of an unnecessary base station being removed from the cooperative group when the measurement result is fed back.

According to the technology of the present disclosure, the measurement result selection unit of the wireless communication apparatus further includes a measurement result evaluation unit that evaluates a measurement result of the respective subbands by the reference signal measurement unit. Then, the measurement result selection unit is configured to select the measurement results of the subbands to be fed back in order to determine the cooperative group, based on an evaluation result of the respective subbands by the measurement result evaluation unit.

According to the technology of the present disclosure, the measurement result evaluation unit of the wireless communication apparatus evaluates quality of the respective subbands, and the measurement result selection unit is configured to select measurement results of a predetermined number of subbands to be fed back, in order to include measurement results of a predetermined number of subbands with poor quality.

According to the technology of the present disclosure, the measurement result evaluation unit of the wireless communication apparatus predicts an expected value of an improvement in quality for the respective subbands by the cooperative group being updated when measurement results are fed back, and the measurement result selection unit is configured to select measurement results of a predetermined number of subbands to be fed back, based on the predicted expected value.

According to the technology of the present disclosure, the wireless communication apparatus further includes a measurement object determination unit that predicts which cooperative group is to be determined by feeding back measurement results and selects a base station which is a measurement object by the reference signal measurement unit based on the predicted result, for the respective subbands. Then, the measurement result evaluation unit is configured to predict an expected value of an improvement in quality due to the predicted cooperative group.

According to the technology of the present disclosure, the measurement result evaluation unit of the wireless communication apparatus evaluates whether or not an unnecessary base station is removed from the cooperative group when measurement results are fed back for the respective subbands, and the measurement result selection unit is configured to select measurement results of a predetermined number of subbands to be fed back, based on a possibility of the unnecessary base station being removed.

According to the technology of the present disclosure, the wireless communication apparatus further includes a measurement object determination unit that predicts which cooperative group is to be determined by feeding back measurement results and selects a base station which is a measurement object by the reference signal measurement unit based on the predicted result, for the respective subbands. Then, the measurement result evaluation unit is configured to evaluate how many useless base stations are to be removed by the predicted cooperative group.

According to the technology of the present disclosure, the measurement result selection unit of the wireless communication apparatus is configured to select the measurement results such that an assembly of subbands which are consecutive in the frequency direction and have the same combination of the base stations constituting the cooperative group is made into a subband group and is fed back in units of subband groups.

Further, the technology of the present disclosure is a wireless communication apparatus including a notification unit that notifies a terminal station of information for determining a range for performing measurement and feedback of reference signals transmitted from respective base stations, under a communication environment in which an entire system bandwidth is used as a wideband and a plurality of subbands obtained by dividing the system bandwidth are used; and a cooperative group determination unit that determines a cooperative group of base stations which performs CoMP for the terminal station in a wideband and the respective subbands, based on information which is fed back from the terminal station.

According to the technology of the present disclosure, the notification unit of the wireless communication apparatus is configured to notify the terminal station of information regarding the cooperative group which is determined by the cooperative group determination unit for the respective subbands.

According to the technology of the present disclosure, the notification unit of the wireless communication apparatus is configured to divide information notified to the terminal station into three types of information indicating a range having a possibility of being measured, information indicating a range which is used most widely, and information indicating a range of a base station which is additionally used for the respective subbands, and notifies the information in different update frequencies for each piece of information.

Further, the technology of the present disclosure is a wireless communication method including a reference signal measurement step of performing measurement of reference signals transmitted from respective base stations, in a wideband and respective subbands, under a communication environment in which an entire system bandwidth is used as the wideband and a plurality of subbands obtained by dividing the system bandwidth are used; a measurement result selection step of selecting measurement results to be fed back in order to determine a cooperative group of base stations which performs CoMP for its own apparatus, among measurement results obtained in the wideband and the respective subbands by the reference signal measurement step; and a feedback step of feeding back the measurement results selected in the measurement result selection step to the base station.

Further, the technology of the present disclosure is a wireless communication method including a notification step of notifying a terminal station of information for determining a range for performing measurement and feedback of reference signals transmitted from respective base stations, under a communication environment in which an entire system bandwidth is used as a wideband and a plurality of subbands obtained by dividing the system bandwidth are used; and a cooperative group determination step of determining a cooperative group of base stations which performs CoMP for the terminal station in a wideband and the respective subbands, based on information which is fed back from the terminal station.

Further, the technology of the present disclosure is a wireless communication system including a plurality of base stations that transmit reference signals; and a terminal station that receives the reference signals from the base stations and performs measurement for determination of a cooperative group which performs CoMP for its own station, in which the terminal station performs measurement of the reference signals transmitted from respective base stations in a wideband and respective subbands, under a communication environment in which an entire system bandwidth is used as the wideband and a plurality of subbands obtained by dividing the system bandwidth are used, and selects and feeds back measurement results necessary for determining a cooperative group of the base stations which performs CoMP for its own apparatus.

However, the "system" referred to herein refers to that in which a plurality of devices (or functional modules for realizing particular functions) are assembled logically, and whether or not the respective devices and the functional modules are present in a single case (hereinafter, the same) is not particularly limited.

Further, the technology of the present disclosure is a wireless communication system including a plurality of base stations that transmit reference signals; and a terminal station that receives the reference signals from the base stations and performs measurement and feedback for determination of a cooperative group of the base stations which performs CoMP for its own station, in which at least one base station notifies the terminal station of information for determining a range for performing the measurement and the feedback of the reference signals transmitted from respective base stations, under a communication environment in which an entire system bandwidth is used as a wideband and a plurality of subbands obtained by dividing the system bandwidth are used.

Advantageous Effects of Invention

According to the technologies disclosed in the present specification, information for the CoMP determining an effective combination can be transmitted from the UE terminal to the eNodeB without an increase in the overhead, and thus it is possible to improve the update frequency of point selection while reducing the overhead of the uplink for the point selection, thereby increasing the throughput.

Other objects, features and advantages of the technologies disclosed in the present specification will become apparent from the following detailed description based on embodiments described below and the accompanying drawings.

DESCRIPTION OF EMBODIMENTS

Hereinafter, embodiments of the technology disclosed in the present specification will be described in detail with reference to drawings.

Figure 15:
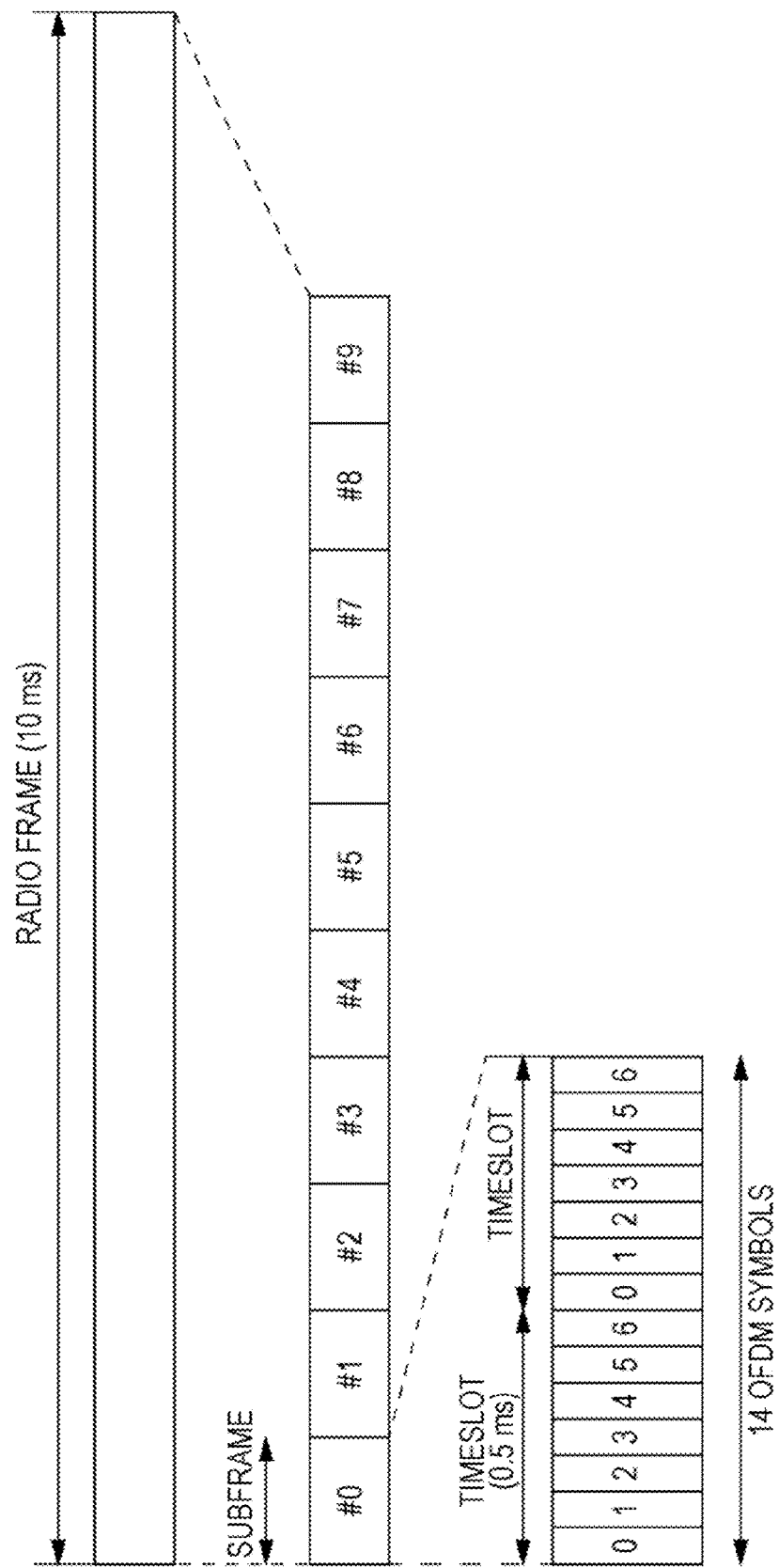
FIG. 15 is a diagram illustrating a radio frame configuration of a downlink of LTE.

LTE is a communication scheme based on an OFDM modulation scheme, and OFDMA is adopted in a radio access method of a downlink. FIG. 15 illustrates a radio frame configuration of a downlink of LTE. As illustrated in the drawings, the radio frame is stratified into three layers in ascending order of time units: a timeslot (Slot), a Subframe, and a Radio frame.

The timeslot of a length of 0.5 ms is configured with 7 OFDM symbols (only in a case of normal unicast transmission) and is a unit of a demodulation process when a user (UE terminal) side performs reception. The subframe of a length of 1 ms is configured with two consecutive timeslots (14 OFDM symbols) and is a transmission time unit of one data packet subjected to a correction encoding. The radio frame of a length of 10 ms is configured with ten consecutive subframes (in other words, 20 timeslots) and is a basic unit for multiplexing of all physical channels. The subframe is divided into a control region PDCCH used as a control signal from the eNodeB, and a data region PDSCH portion used as user data.

If respective users use different subcarriers or different timeslots, the users can communicate without interfering with each other. In LTE, a minimum unit of radio resource assignment which is termed "Resource Block (RB)" is defined by blocking consecutive subcarriers. A scheduler mounted on the base station (eNodeB) assigns radio resources with respect to each user, in units of Resource Blocks. The Resource Block is configured with 12 subcarriers×1 timeslot (seven OFDM symbols=0.5 ms). In addition, a maximum of three OFDM symbols from the beginning of the subframe are used for the control channel, in other words, the PDCCH. The scheduler of the base station can perform assignment of the Resource Block to every subframe, that is, at an interval of 1 ms. Positional information of the Resource Block is termed scheduling. Both the scheduling information of the uplink and the scheduling information of the downlink are described in the control channel of the downlink. Each user can see the control channel and recognize the Resource Block assigned to him or her.

The timeslot of the length of 0.5 ms is a minimum unit of assignment available to each user. The scheduler mounted on the base station (eNodeB) assigns available timeslots to each user in units of timeslots. In LTE, it is possible to select two types of communication scheme: the FDD and the TDD. In the case of the TDD, it is possible to select either the uplink or the downlink for use for each subframe.

When CoMP is applied to a data communication system that is compliant with LTE, it is important to configure a CoMP set with a necessary minimum number of eNodeBs satisfying the quality necessary for the UE terminal. Further, if considering the movement of the UE terminal, a dynamic point selection that dynamically updates the CoMP set is desirable. When the update of the point selection is performed, it is necessary to consider a decrease in throughput due to a reference signal occupying communication sequences within the system, an increase in the overhead of the uplink due to the feedback of the measurement result of the reference signal by the UE terminal to the eNodeB, and an increase in power consumption of the UE terminal accompanying the measurement of the reference signal and the feedback of the measurement results.

The reference signal transmitted from the eNodeB includes a CRS, a CSI-RS, and a SRS. The measurement of the reference signal can be generally used for various purposes. A first purpose includes the UE terminal searching for an eNodeB of a handover destination. When the quality of a Serving eNodeB deteriorates, the UE terminal performs measurement for an eNodeB in an adjacent cell in order to search for an eNodeB of a next handover destination. A second purpose includes acquiring the quality of the channel. The measurement of the reference signal is performed for determining a value of precoding (a weighting factor of an antenna for performing a beam forming) used on the eNodeB side at the time of transmission in the downlink, or for the scheduler in the eNodeB distributing the radio resources to each UE terminal. Then, obtaining information necessary for the point selection is added as a new object of the measurement of the reference signal. Further, it is considered that the UE terminal feeds back also the measurement results which are a material for determining the CoMP set, in addition of the feedback information of the reference signal.

Figure 16:
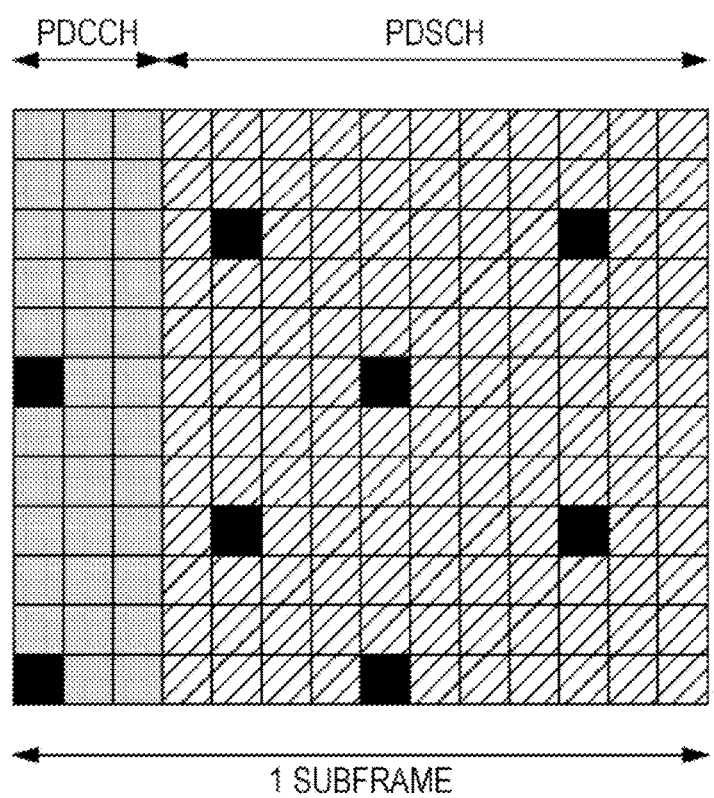
FIG. 16 is a diagram illustrating an aspect in which a CRS is inserted into a subframe.

Here, a Cell-specific Reference Signal (CRS) is a reference signal that is inserted into the subframe of the downlink and has existed since Release 8 which is the initial version of LTE. FIG. 16 illustrates an aspect in which the CRS is inserted into the subframe. In the illustrated example, the first to third OFDM symbols are PDCCHs, and the fourth and subsequent OFDM symbols are PDSCHs. In FIG. 16, although the resource element portions filled in black correspond to CRS signals, the CRS is inserted into the region of both the PDCCH and the PDSCH.

Even if the user data of the PDSCH is not transmitted from the eNodeB, the CRS is transmitted from the eNodeB. That is because it is assumed that the UE terminal always uses the CRS for synchronization acquisition and channel estimation with the eNodeB, quality measurement of the eNodeB, and the like.

The CRS uses the same location (that is, the same resource element in a frequency direction and a time direction) in each eNodeB (in FIG. 16, the resource elements filled in black are commonly used as insertion locations of the CRS in each eNodeB). Therefore, it is necessary to ensure that the eNodeBs are orthogonal with each other, and signals having different sequences for the respective eNodeBs are used in the CRS. The number of sequences is 504 in total. If the Cell IDs of the eNodeBs are different, the sequences of the CRS are also different. From the meaning of being specific for each cell, the signals are called Cell-specific Reference Signals.

Further, although a Channel State Information Reference Signal (CSI-RS) is a reference signal included in a downlink signal, the CSI-RS is not necessarily included in all the subframes but is inserted in every predetermined cycle. For example, it is possible to set so as to transmit the CSI-RS once every 5 ms to 80 ms in one subframe. The setting of the period can be changed quasi-statically in a Radio Resource Control (RRC: radio link control connection) Signaling.

The CSI-RS is a reference signal which was newly introduced in Release 10 of 3GPP. The CSI-RS is also a signal specific for each cell, and can be referred to as "Cell-specific". The locations of the resource elements, to which the CSI-RSs are inserted, in the subframe can be changed by the setting. A sequence for improving an orthogonality between eNodeBs is prepared also in the inserted signals.

A case of using the CSI-RS as the reference signal for the point selection is considered. Since it is possible to set the transmission period to 5 ms to 80 ms as described above, the CRS-RS has a great advantage of being able to reduce the overhead occupied by the reference signal. Further, even in the eNodeBs having the same Cell ID, it is possible to assign the CSI-RS in different locations. If the CSI-RS is separately set even in a case in which the same Cell ID is assigned to a plurality of Pico eNodeBs such as the RRHs, as in the case of realizing CoMP by an intensive control scheme, the UE terminal can perform the measurement while distinguishing the respective RRHs. Accordingly, the present inventors contemplate that the CSI-RS is promising as the reference signal for the point selection.

Further, the Sounding Reference Signal (SRS) is a reference signal that is included in the subframe of the uplink and has existed since Release 8 of 3GPP. The SRS is inserted over all frequency ranges of the last OFDM symbol of 14 OFDM symbols in the corresponding subframe. The insertion period of the SRS can be changed from 2 ms to 160 ms. The eNodeB acquires a channel state of the uplink based on the SRS and uses the channel state as information for scheduling.

If the SRS is used, it is possible to acquire the channel condition of the uplink with a small overhead. At the time of the TDD, since the reversibility of the channel is guaranteed, the eNodeB is able to use the SRS also in order to obtain the channel condition of the downlink in the case of the TDD.

There are scenarios 1 to 4 as a scenario for realizing CoMP. Scenario 1 is a scenario that makes cells into sectors and performs CoMP between the sectors. Further, although scenarios 2 to 4 are scenarios that perform CoMP using the RRH, the RRH performs transmission with great power equivalent to that of the Macro eNodeB in scenario 2, whereas it is assumed that the transmission power of the RRH is small in scenarios 3 to 4. The Cell ID of its own is assigned to each RRH in scenario 3, whereas the same Cell ID as that of the Macro eNodeB is assigned to each RRH in scenario 4.

Figure 1:
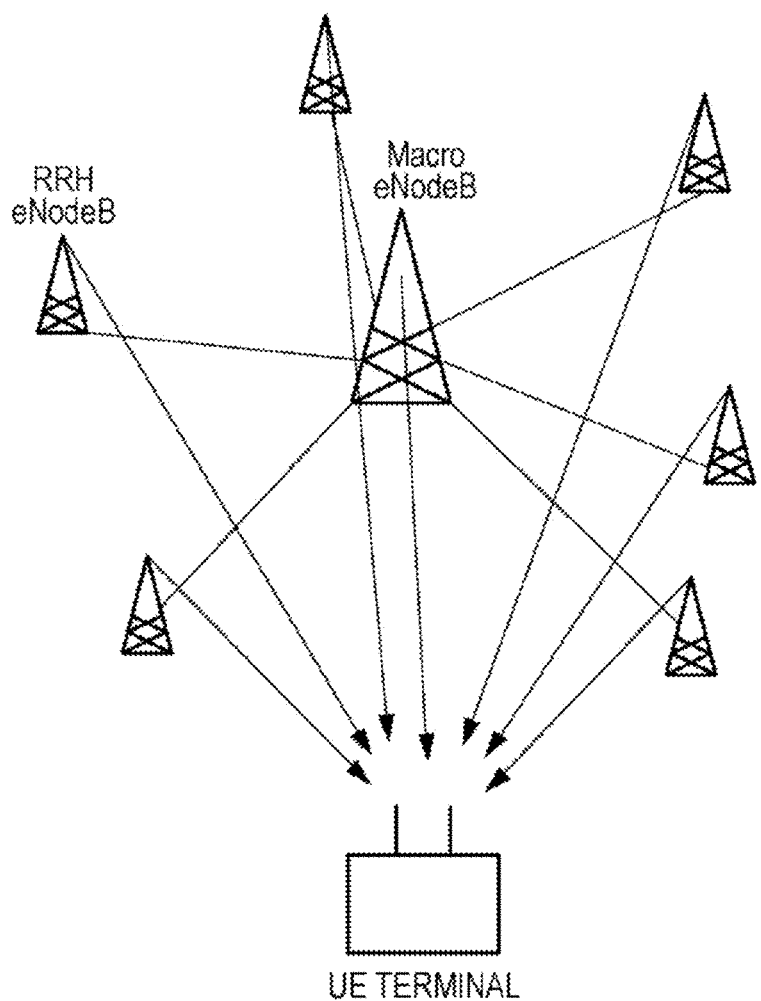
FIG. 1 is a diagram schematically illustrating an aspect in which a Macro eNodeB and a plurality of RRHs subordinate thereto are connected.

FIG. 1 schematically illustrates an aspect in which a Macro eNodeB corresponding to scenario 3 and scenario 4 and a plurality of RRHs subordinate thereto are connected. The RHHs are disposed as a measure for non-sensing in cell edges. The Macro eNodeB and respective RHHs (or a Pico eNodeB) are connected by baseband signals using an X2 interface made from optical fibers, or the like. Then, the Macro eNodeB performs a baseband signal process and control of respective RRHs and collectively performs radio resource control between cells. The Macro eNodeB and the RRH transmit and receive data to and from the UE terminal at the same time so as to perform CoMP. The Macro eNodeB mainly operates as a Serving eNodeB.

In the system illustrated in FIG. 1, a reference signal used in the point selection will be considered.

In scenario 3, the respective RRHs have their own Cell IDs and have different sequences of CRS. Accordingly, even if the reference signals are simultaneously transmitted from the respective RRHs, the UE terminal can individually acquire a quality of the respective RRHs. In other words, in scenario 3, it is possible to use the CRS as the reference signal for the point selection.

In contrast, in scenario 4, the same Cell ID as that of the Macro eNodeB is assigned to the respective RRHs, and the sequence of the CRS is the same. Therefore, the UE terminal cannot individually obtain a quality of the respective RRHs, from the CRSs simultaneously transmitted from the respective RRHs. In other words, in scenario 4, it is difficult to use the CRS in the reference signal for the point selection. Therefore, in scenario 4, the CSI-RS is promising as the reference signal for the point selection. In this case, it is necessary for the UE terminal side to individually acquire channel information for each RRH, by assigning the CSI-RS to different locations for each RRH (as described already, even the eNodeB having the same Cell ID is able to assign the CSI-RS to different locations).

In LTE, since Release 8, there have been three types of mode: Implicit Feedback, Explicit Feedback, and SRS-based Feedback, as a feedback scheme at the time of Single User Multiple Input Multiple output (SU-MIMO) communication. Among these, Implicit Feedback is used even in Release 10. Further, Implicit Feedback is determined in CoMP of Release 11 and the MIMO communication in the CoMP for use.

Here, procedures of the Implicit Feedback scheme are described. In the base station, in a codebook which is designed in advance, 16 types of transmission weighting (precoding) such as, for example, V(1), . . . , and V(16) are prepared (however, the number i within parentheses of V(i) is an index number of Predetermined Matrix Index (PMI)). If the mobile station receives a reference signal which is precoded with the transmission weighting V(i) from the base station, the mobile station acquires channel information H between the base station and the mobile station. Then, if the mobile station temporarily determines which reception power HV(1), . . . , HV(16) is the greatest, among 16 types of transmission weight vectors V(1), . . . , V(16), the mobile station feeds back the index number indicating a transmission weight vector V which is temporarily determined to the base station. Hereinafter, the base station transmits data using the transmission weighting V corresponding to the index number which is fed back.

In Release 10, there are three types of signal: a Channel Quality Index (CQI), a Predetermined Matrix Index (PMI), and a Rank Indicator (RI), as a signal which is fed back from the mobile station to the base station.

The CQI is intended to notify a combination of a modulation scheme and a coding rate, and has 16 types. As the modulation scheme, there are three types: a Quadrature Phase Shift keying (QPSK), a 16 Quadrature Amplitude Modulation (QAM), and a 64 QAM. Further, the PMI is an index number indicating the desired transmission weight vector V which is described above. Further, the RI is an index indicating a rank of a channel, that is, regarding how many spatially independent channels are present.

The eNodeB determines the precoding for transmission, the modulation scheme, and the coding rate with reference to three types of information of the CQI, the PMI, and the RI which are transmitted from the UE terminal.

In Release 11, although adding information regarding quality from each base station to the feedback information from the mobile station to the base station is considered, the present applicants consider that the above feedback information defined in Release 10 is a base.

The Implicit Feedback among the feedback schemes described above will be described in further detail. Although there are a plurality of modes in the feedback, hereinafter, feedback mode of Release 8 will be described.

Figure 2:
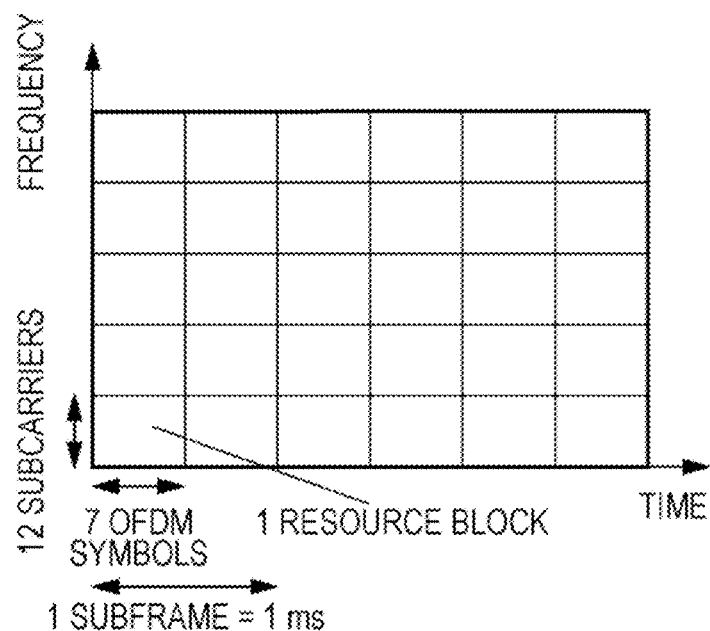
FIG. 2 is a diagram illustrating a subband.
Figure 3:
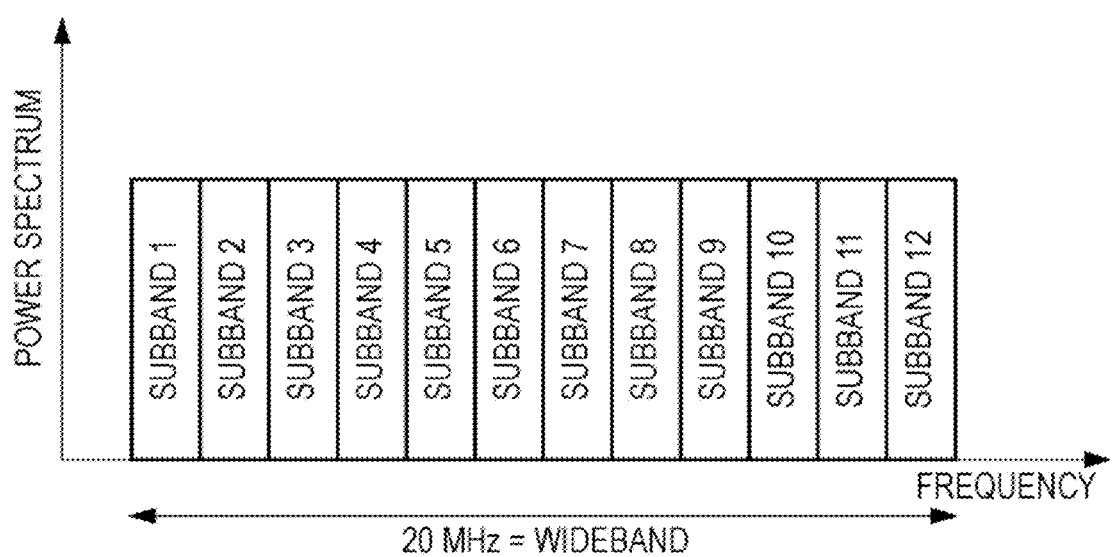
FIG. 3 is a diagram illustrating a UE Selected mode.

The CQI feedback can be divided into a wideband and a subband (UE Selected). The wideband mode is a mode of feeding back the feedback information corresponding to 20 MHz as one piece of information in a case of operation, for example, in a bandwidth of 20 MHz. The subband is a method of use of setting a subband by further binding a bundle of a plurality of Resource Blocks, for example, 12 subcarriers (see FIG. 2). For example, the subband is a method of use in which 120 subcarriers are set as one band in the frequency direction. Meanwhile, the UE Selected mode is a mode of individually returning the feedback for the subbands. The feedback is performed for the M best subbands. In addition, the value of the wideband is also reported (see FIG. 3).

The PMI feedback includes a case without feedback and a case with feedback. In Release 8, there are feedback modes shown in the table below due to combining the feedback modes of the PMI and the CQI.

TABLE 1

|  | No PMI | Single PMI |
| --- | --- | --- |
| Wideband (wideband CQI) | Mode 1-0 | Mode 1-1 |
| UE Selected (wideband CQI) | Mode 2-0 | Mode 2-1 |

If the dynamic point selection is considered, the present applicants understand that considering the relationship with the feedback mode is important.

The subband described above is not associated with CoMP and the point selection at all, and relates to feedback in an environment in which CoMP is not performed.

It is necessary to frequently evaluate the quality of the downlink between the UE terminal and each eNodeB in order to dynamically update the CoMP set, that is, to realize the dynamic point selection. However, in order to frequently perform the evaluation, it is necessary to consider an overhead generated by frequently inserting the reference signal into the downlink and an increase in power consumption of the UE terminal that frequently receives and measures the reference signal.

First Problem Accompanying Feedback

There is a first problem in which if the UE terminal feeds back the measurement results for the same eNodeB, corresponding to the wideband and all the subbands, the feedback resources of the uplink are wasted, the overhead is increased, and thus the throughput of uplink decreases.

Means 1-1 for solving the above first problem includes selecting the measurement results to be fed back for determining the CoMP set from the UE terminal such that a set of measurement results of the base station in the wideband is a population and a set of measurement results in the respective subbands is a subset for the population.

Figure 4:
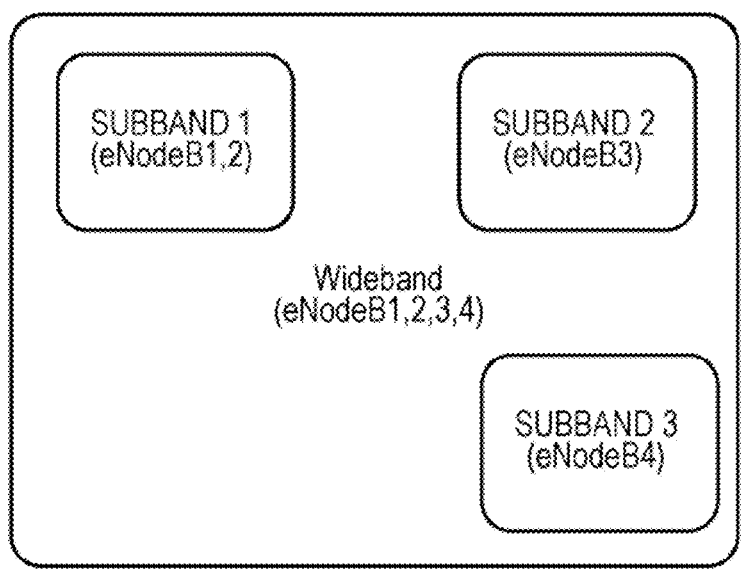
FIG. 4 is a diagram illustrating an example in which only subsets are fed back in subbands independently of a measurement result of a wideband (a case where the wideband is a population).

For example, it is assumed that a certain UE terminal feeds back the measurement results of the reference signals from four base stations which are eNodeBs 1, 2, 3, and 4, as the measurement results for determining the CoMP set in the wideband. In this case, the set of the measurement results with respect to the eNodeBs 1, 2, 3, and 4 is a population. Then, it is assumed that in the subband 1, the feedback for determining the CoMP set is performed not by selecting the measurement results with respect to all the populations but by selecting only the measurement results with respect to the eNodeBs 1 and 2 which are subsets for the population. In the same manner, it is assumed that only the measurement result with respect to the eNodeB 3 which is a subset for the population is selected and fed back in the subband 2, and only the measurement result with respect to the eNodeB 4 which is a subset for the population is selected and fed back in the subband 3 (see FIG. 4). In this manner, the wideband is the population and only subsets are fed back independently of the measurement results of the wideband in the subbands. Accordingly, it becomes possible to reduce the feedback amount of the UE terminal.

In the wideband and subband of this case, both the measurement for the eNodeB which is in use as a transmission point of CoMP and the measurement of the eNodeBs which are candidates of the transmission point are performed.

According to the means 1-1, there is an advantage in that the UE terminal returns information for determining which eNodeB is desirable with respect to all the frequencies of the UE terminal in the feedback of the wideband and thus the eNodeB side receiving the feedback is able to ascertain a rough tendency. The rough tendency is information indicating which eNodeB is suitable for being added to the CoMP set, with respect to the UE terminal.

Further, in the subband, the UE terminal may select only more important information for the respective subbands and feed back the selected information. For example, the measurement results regarding base stations that participate in a current CoMP set in the subband, a base station under consideration to be removed from the CoMP set due to deterioration in quality, a base station under consideration to be newly added to the CoMP set and the like are more important feedback information for the subband.

Accordingly, in means 1-1, the period of the feedback of the wideband from the UE terminal is set to be relatively long, and the period of the feedback of the subband is set to be short.

Means 1-2 for solving the first problem may include selecting the measurement results to be fed back for determining the CoMP set from the UE terminal so as to include measurement results of base stations other than the set of the measurement results in the respective subbands in addition to the set of the measurement results of the base station in the wideband.

Figure 5:
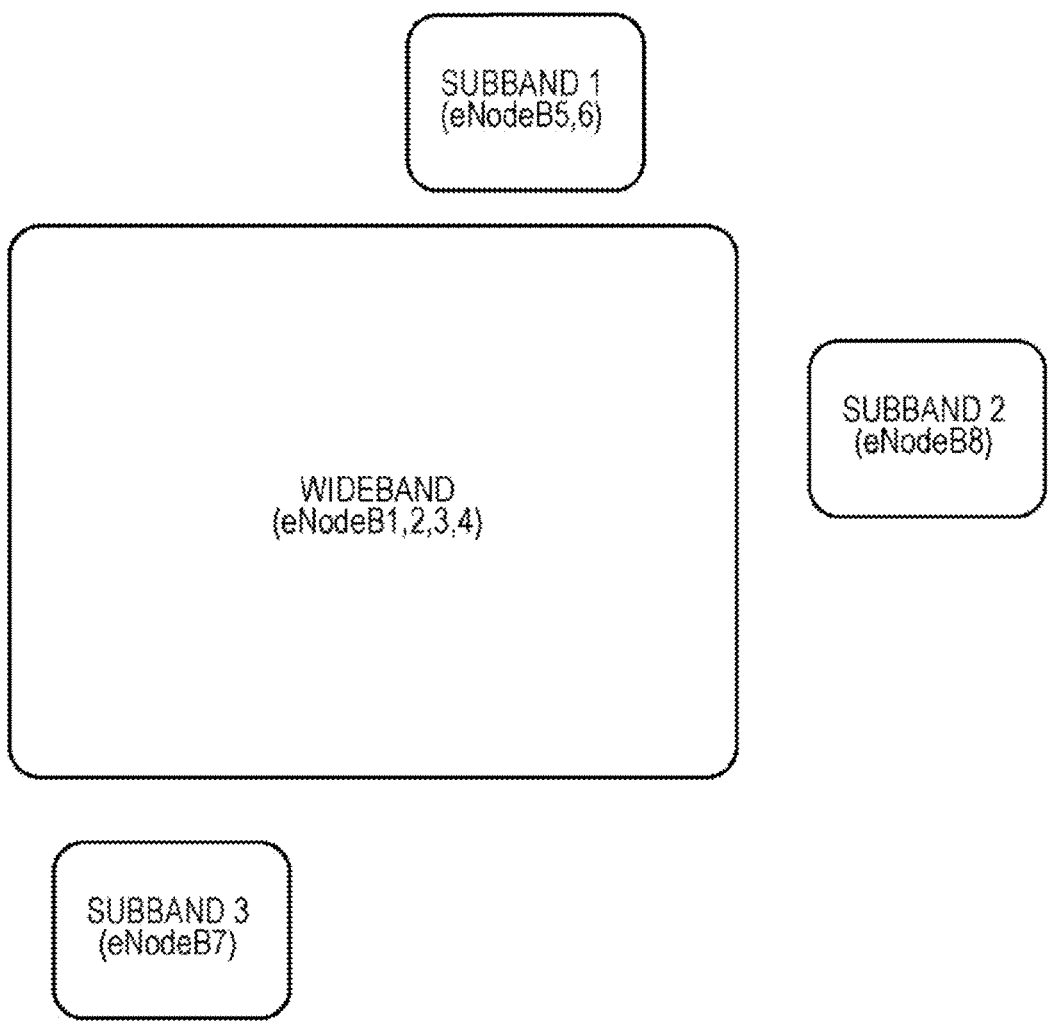
FIG. 5 is a diagram illustrating an example in which feedback, which is not included in the wideband, is performed in the subbands.

For example, it is assumed that a certain UE terminal feeds back the measurement results of the wideband with respect to four base stations which are eNodeBs 1, 2, 3, and 4 as the measurement results for determining the CoMP set in the wideband. In this case, it is assumed that the measurement results are fed back so as to include the eNodeBs 5 and 6 other than the eNodeBs 1, 2, 3 and 4 in the subband 1. In the same manner, it is assumed that the measurement results are fed back so as to include the eNodeB 8 other than the eNodeBs 1, 2, 3 and 4 in the subband 2, and it is assumed that the feedback of the measurement results is performed so as to include the eNodeB 7 other than the eNodeBs 1, 2, 3 and 4 in the subband 3 (see FIG. 5). In this manner, the measurement result with respect to an eNodeB which is not included in the wideband is fed back in the subband. The UE terminal is able to reduce the feedback amount by performing the measurement of an additional eNodeB in the measurement in a part of a band, with respect to the measurement considering all the bands.

Further, a derived type of the above means 1-2 includes selecting the measurement results to be fed back for determining the CoMP set from the UE terminal so as to include the measurement result of a base station added to the combination of the base stations in the set of the measurement results in the respective subbands, in addition to the set of the measurement results of the base station in the wideband.

Figure 6:
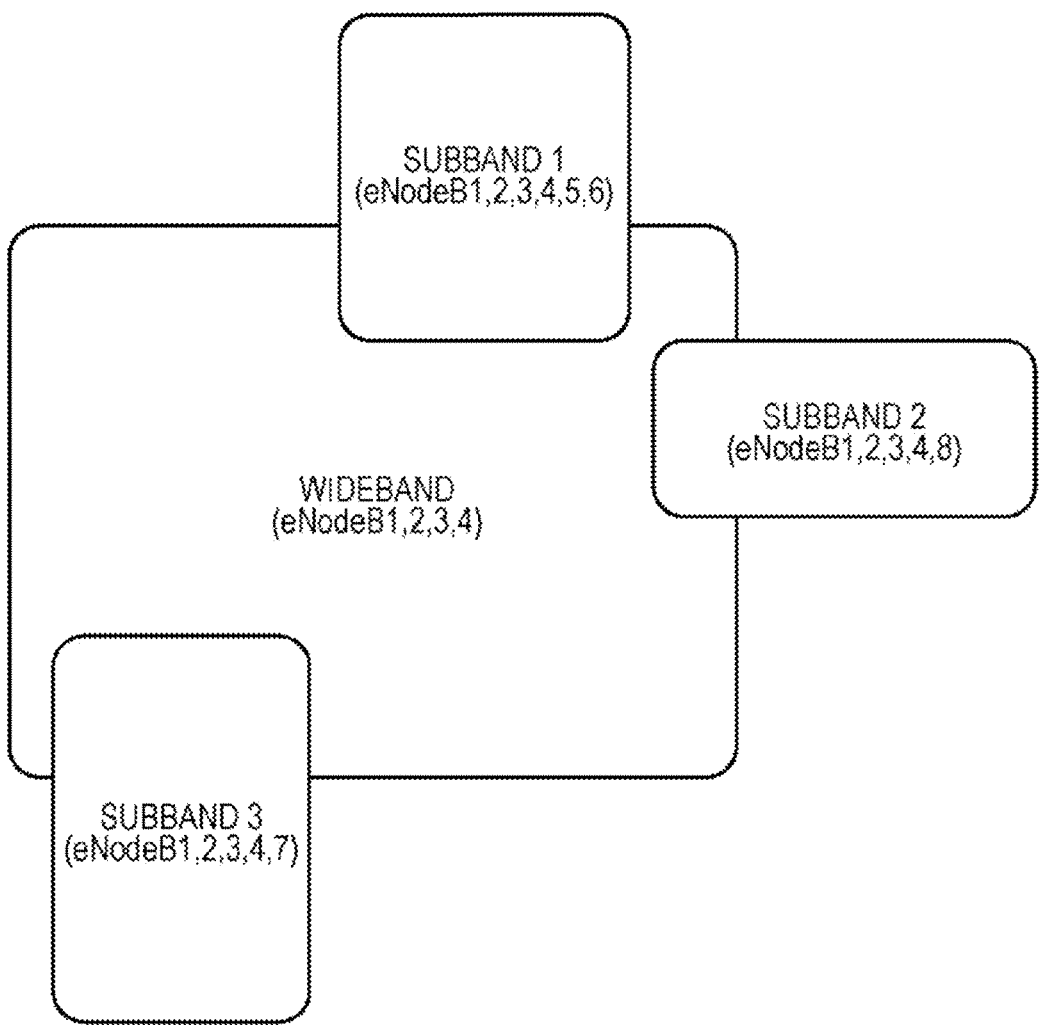
FIG. 6 is a diagram illustrating another example in which feedback, which is not included in the wideband, is performed in the subbands.

For example, it is assumed that a certain UE terminal feeds back the measurement results of the wideband with respect to four base stations which are the eNodeBs 1, 2, 3, and 4 as the measurement results for determining the CoMP set in the wideband. In this case, it is assumed that the measurement results are fed back while the eNodeBs 5 and 6 are added to the eNodeBs 1, 2, 3 and 4 in the subband 1. In the same manner, it is assumed that the measurement results are fed back while the eNodeB 8 is added to the eNodeBs 1, 2, 3 and 4 in the subband 2, and it is assumed that the measurement results are fed back while the eNodeB 7 is added in the subband 3 (see FIG. 6). In this manner, in the subband, the measurement results, to which the eNodeBs which have not been included in the wideband are added, are fed back.

Further, in a derived type of the above means 1-2, since the measurement of the eNodeBs of a greater number than that in the wideband is performed in the subband, it is intended for a case of measuring the information of the respective subbands in more detail.

Second Problem Accompanying Feedback

For dynamic point selection of CoMP, when the UE terminal selects and feeds back the set of the measurement results in the subband, the priority of the subband to be fed back is determined by the UE terminal or by the base station depending on a situation. When the priority is determined by the base station, it is assumed that information regarding the determined priority is notified from the base station to the UE terminal.

There is a second problem in which the subband having information greatly affecting the selection of the base station which performs the CoMP transmission should be prioritized in determining the priority of the subband in which the measurement result is fed back.

The selection of the base station referred to here is both the addition and the removal of a base station included in the CoMP set. When the addition of a new base station to the CoMP set is determined by feeding back the measurement result of a certain subband, the improvement in reception quality of the UE terminal in the subband is expected. Further, when the removal of a certain base station from the CoMP set is determined by feeding back the measurement result of a certain subband, the improvement in throughput is expected by suppressing unnecessary radiation from unnecessary base stations. When the feedback is given, the measurement result of the subband having a high possibility of an unnecessary base station being removed from the cooperative group is preferentially selected.

Therefore, means 2 for solving the above second problem includes preferentially feeding back the information of a subband having a high possibility of the determination of the addition or removal of the base station being performed on a network side. In other words, when the feedback is given, the measurement result of the subband having a high possibility of an improvement in the reception quality by a new base station being added to the CoMP is preferentially selected, and when the feedback is given, the measurement result of the subband having a high possibility of an unnecessary base station being removed from the CoMP set is preferentially selected.

In contrast, with respect to a subband in which the addition or the removal of the base station is not performed on a network side, the overhead of control information only increases even if information is fed back, and thus lowering the priority of such a subband is important.

In a case where the UE terminal side feeds back information of M selected subbands, in Release 8, the UE terminal selects M subbands with higher quality. However, if the measurement necessary for the dynamic point selection of the CoMP is performed in the subband with higher quality, the advantage of feeding back a new measurement result is not derived. In other words, the measurement result of the subband with good quality does not greatly affect the selection of the base station that performs the CoMP transmission, and thus it is not possible to solve the above second problem. In a subband with poor quality, although the update of the point selection (in other words, replacement of base station belonging to the CoMP set) is necessary, if the measurement result is not fed back, the CoMP set is not improved and the quality of the subband remains poor.

Means 2-1 for solving the above second problem includes the UE terminal selecting not M subbands with high quality but M subbands with poor quality. This is because the improvement in quality by the dynamic point selection with respect to the subbands with poor quality is needed the most.

Here, in the subbands with poor quality, CoMP is already applied and thus it is assumed that the UE terminal simultaneously receives signals from a plurality of eNodeBs, but this means that the total quality is poor.

Figure 7:
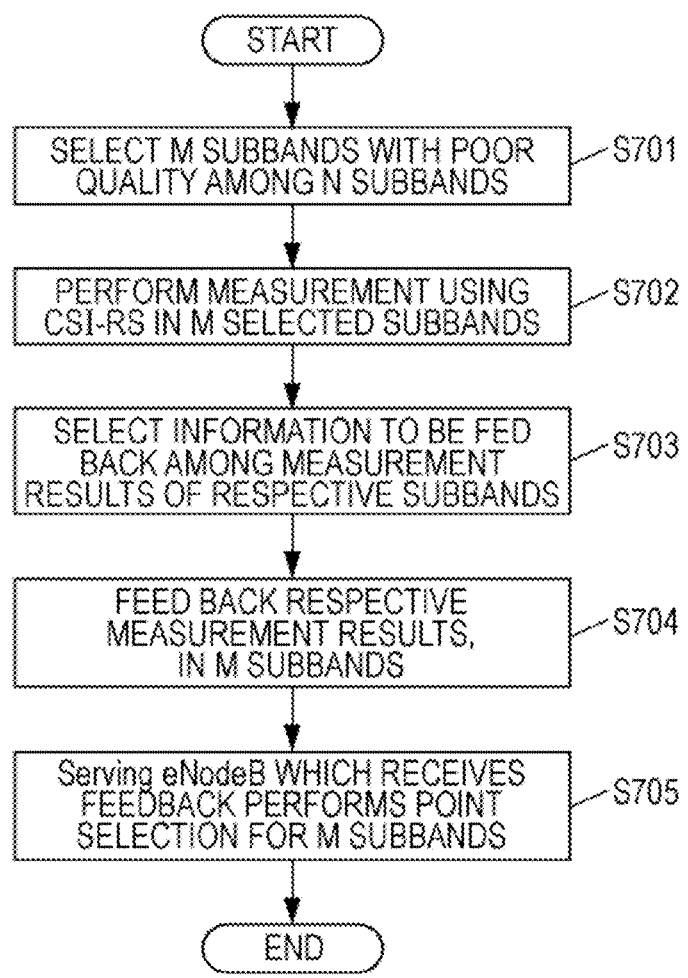
FIG. 7 is a flowchart illustrating a processing procedure for performing a dynamic point selection based on feedback in a predetermined number of subbands.

FIG. 7 illustrates a processing procedure in a form of a flowchart in which the UE terminal feeds back a set of measurement results in a predetermined number of subbands and performs a dynamic point selection based thereon. Hereinafter, it is assumed that the number of subbands which are available for use by the UE terminal is N and the number of subbands in which the measurement result is fed back is M (where N≥M).

The UE terminal selects M subbands with poor quality among N subbands (step S701).

Then, the UE terminal performs the measurement for the point selection, using the CSI-RSs transmitted from the respective base stations in the M selected subbands (step S702).

Next, the UE terminal selects information to be fed back, in other words, a base station of which the measurement result is to be fed back, in each of the M selected subbands (step S703). For example, the UE terminal selects the measurement results of the eNodeB which is in use as the transmission point in the current CoMP set and the eNodeB which is the candidate for the transmission point.

Then, the UE terminal feeds back the measurement results which are selected in step S703 to the Serving eNodeB in each of the M subbands selected in step S701 (step S704).

If the Serving eNodeB side receives the feedback from the UE terminal, it performs the point selection for the M subbands (step S705).

Further, means 2-1-1 for solving the above second problem includes increasing a priority of a subband for which improvement in quality due to feedback will be to a high degree, and selecting M subbands to be fed back. In other words, when a certain subband has a high expected value of improvement in quality, without necessarily being related to the relative merits of the quality of the subband, by feeding back the measurement result of a new eNodeB and using the new eNodeB for the downlink in the subband (that is, a new base station is added in the CoMP set), the subband is preferentially included in the M subbands.

Figure 8:
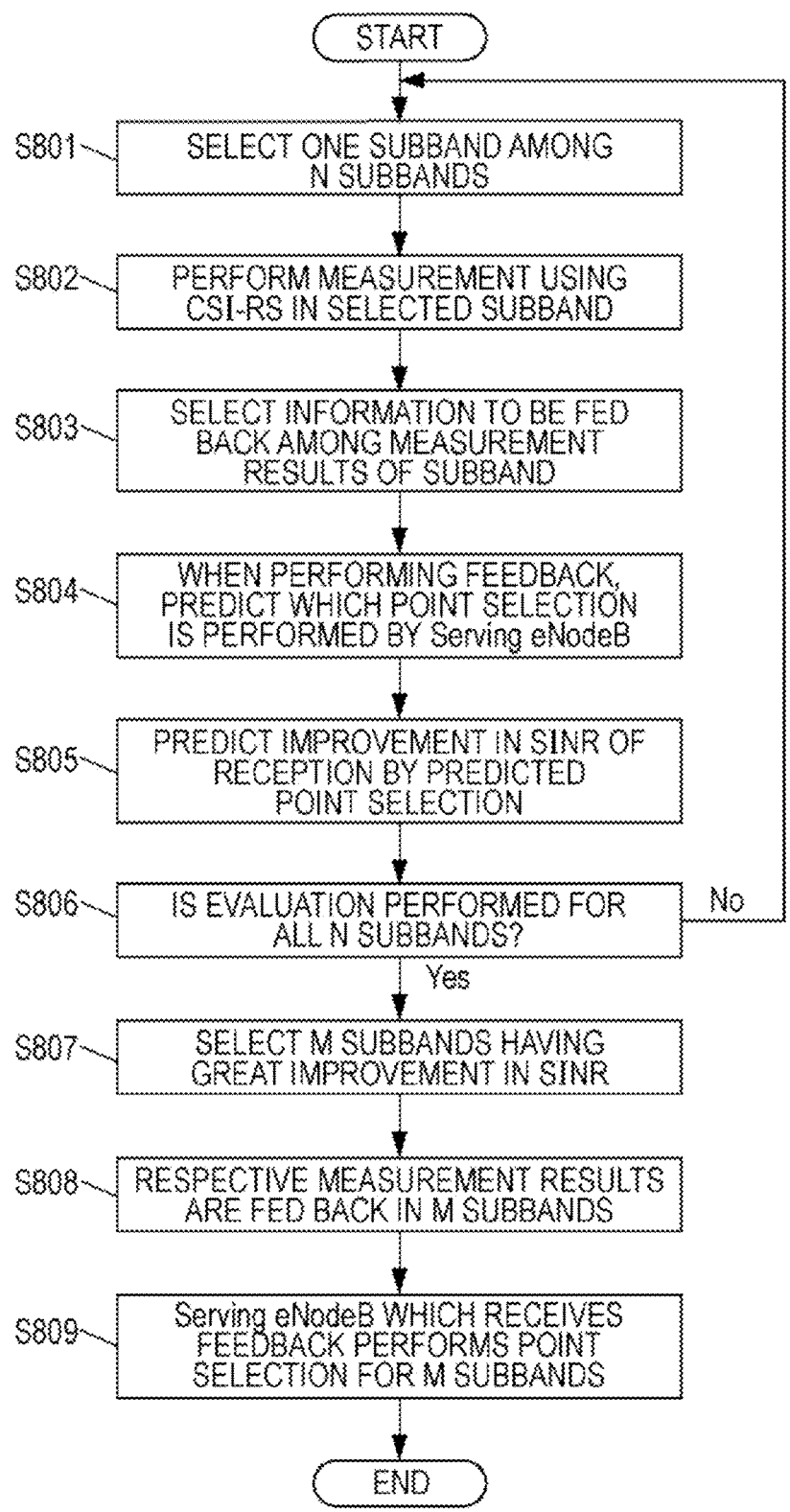
FIG. 8 is a flowchart illustrating a processing procedure for performing feedback for a predetermined number of subbands which are selected by increasing a priority of a subband with a high degree to which the quality is to be improved by feedback.

FIG. 8 illustrates a processing procedure in a form of a flowchart of performing a dynamic point selection which performs feedback for a predetermined number of subbands which are selected by increasing a priority of a subband with a high degree to which the quality is to be improved by feedback.

The UE terminal selects one subband among N subbands (step S801).

Then, the UE terminal performs the measurement for the point selection, using the CSI-RSs transmitted from the respective base stations in the selected subbands (step S802).

Next, the UE terminal selects information to be fed back, in other words, a base station of which the measurement result is to be fed back, in the selected subbands (step S803).

Here, when the UE terminal feeds back the measurement result of the base station which is selected in step S803, the UE terminal predicts which point selection is to be performed for the subband on the Serving eNodeB side (step S804). Then, the evaluation of the subband is performed by predicting an SINR of reception by the predicted point selection (step S805).

If the UE terminal terminates the evaluation for all the N subbands (step S806), it selects M subbands having a great improvement in the SINR (step S807).

Then, the UE terminal feeds back the measurement result measured in step S802 to the Serving eNodeB, in each of the M selected subbands (step S808).

If the Serving eNodeB side receives the feedback from the UE terminal, it performs the point selection for the M subbands (step S809).

Further, means 2-1-2 for solving the second problem includes the UE terminal increasing the priority of a subband having high possibility of useless eNodeBs being removed from the CoMP set by the feedback and selecting the M subbands to be fed back.

Although the measurement result of the eNodeB in use as the CoMP set is fed back in a specific subband with high quality, the eNodeB which does not contribute to a significant improvement in the quality has a high possibility of being removed from the CoMP set in the subband. Therefore, the measurement result of the subband, in which the measurement result which is expected to be determined to be removed from the CoMP set can be fed back, should be fed back.

Figure 9:
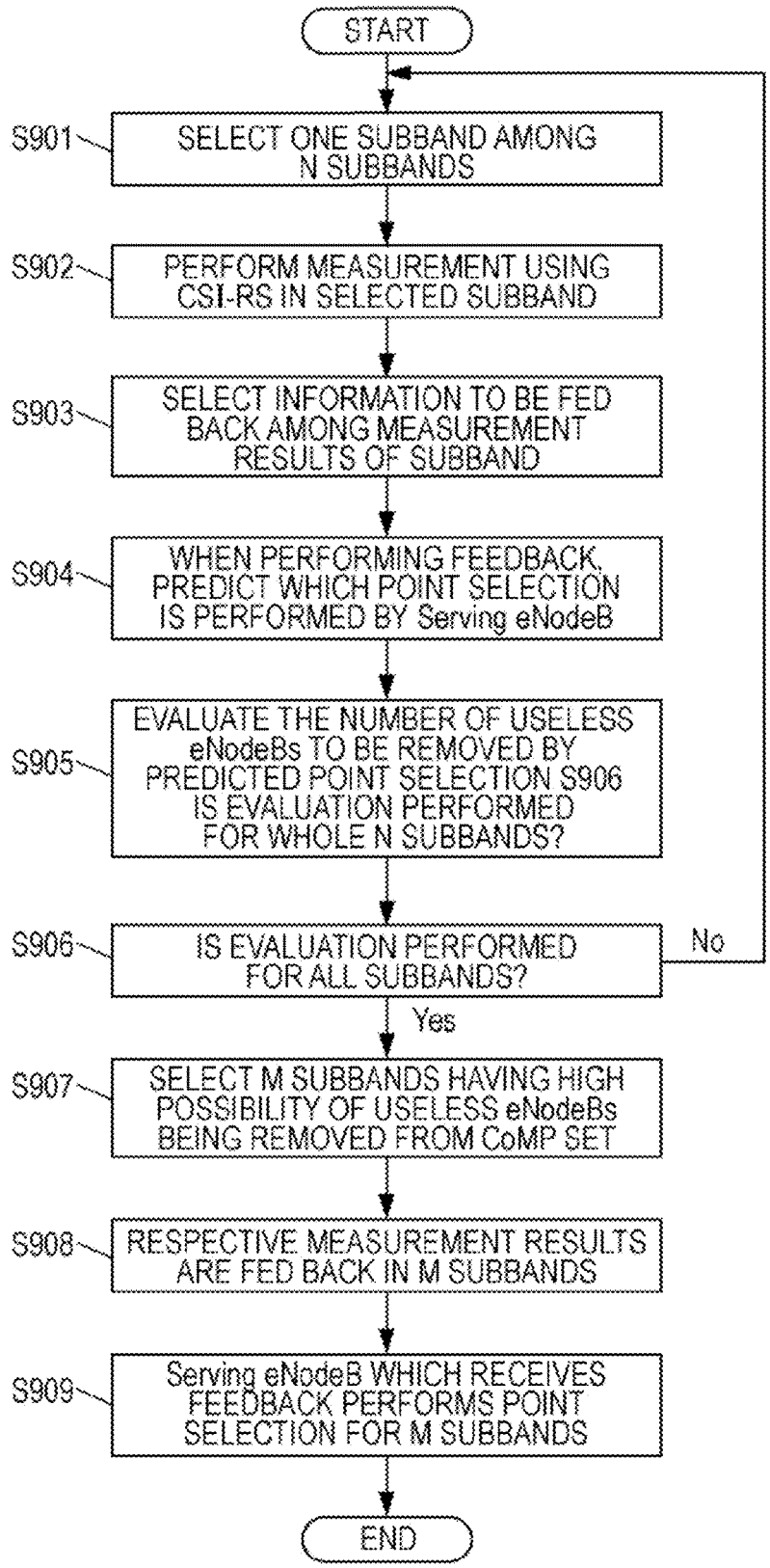
FIG. 9 is a flowchart illustrating a processing procedure of performing feedback for a predetermined number of subbands which are selected by increasing a priority of a subband with a possibility of useless eNodeBs being removed from the CoMP by feedback.

FIG. 9 illustrates a processing procedure in a form of a flowchart of performing a dynamic point selection which performs feedback for a predetermined number of subbands which are selected by increasing a priority of a subband with a possibility of useless eNodeBs being removed from the CoMP by feedback.

The UE terminal selects one subband among N subbands (step S901).

Then, the UE terminal performs the measurement for point selection, using the CSI-RSs transmitted from the respective base stations in the selected subbands (step S902).

Next, the UE terminal selects information to be fed back, in other words, a base station of which the measurement result is to be fed back, in the selected subbands (step S903).

Here, when the UE terminal feeds back the measurement result of the base station which is selected in step S903, the UE terminal predicts which point selection will be performed for the subband on the Serving eNodeB side (step S904). Then, the evaluation of the subband is performed by evaluating the number of useless eNodeBs to be removed from the CoMP sets by the predicted point selection (step S905).

If the UE terminal terminates the evaluation for all the N subbands (step S906), it selects M subbands having a high possibility of the useless eNodeBs being removed from the CoMP set (for example, as a result of the evaluation in step S905, subbands having large number of eNodeBs to be removed from the CoMP set) (step S907).

Then, the UE terminal feeds back the measurement result measured in step S9802 to the Serving eNodeB, in each of the M selected subbands (step S908).

If the Serving eNodeB side receives the feedback from the UE terminal, it performs point selection for the M subbands (step S909).

Further, means 2-2 for solving the second problem includes making an assembly of subbands which can be collectively handled, into a subband group (Group of Subbands), performing the measurement for point selection in units of subband groups, and feeding back the measurement results in units of subband groups.

Figure 10:
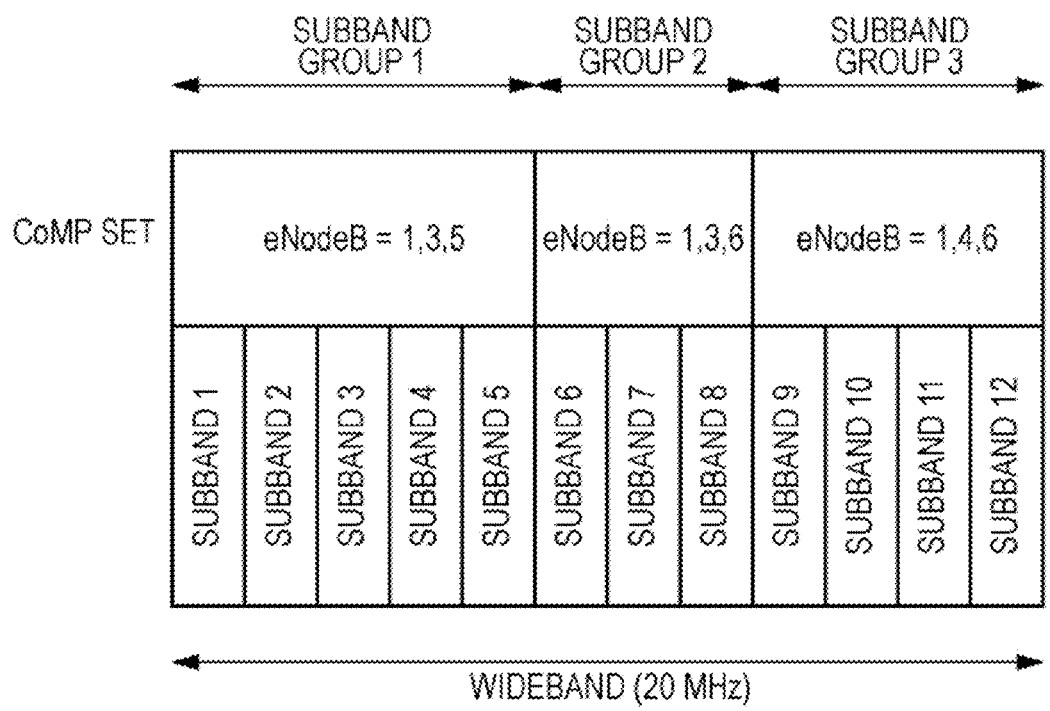
FIG. 10 is a diagram illustrating an aspect in which the same CoMP set is consecutive or CoMP sets are consecutive in the subbands which are consecutive in the frequency direction.

There are some cases in which the same CoMP set consecutively operates in the respective subbands. Since the subbands are consecutive in the frequency direction, it is expected that the changes in the CoMP sets are also consecutive. FIG. 10 illustrates an aspect in which the same CoMP set is consecutive or CoMP sets are consecutive in the subbands which are consecutive in the frequency direction. In the illustrated example, the CoMP sets are formed of three eNodeBs 1, 3, and 5 in any one of the subbands 1 to 5 which are consecutive in the frequency direction, and thus it is possible to make the CoMP sets into the subband group 1. In the same manner, since the CoMP sets are formed of three eNodeBs 1, 3, and 6 in any one of subbands 6 to 8, it is possible to make the CoMP sets into the subband group 2, whereas since the CoMP sets are formed of three eNodeBs 1, 4, and 6 in any one of subbands 9 to 12, it is possible to make the CoMP sets into the subband group 3. Further, the CoMP sets continuously change between the subband group 1 and the subband group 2 and between the subband group 2 and the subband group 3.

The UE terminal can reduce a processing amount required for the measurement and an information amount to be fed back by performing the measurement for point selection and the feedback thereof in units of subband groups.

Figure 11:
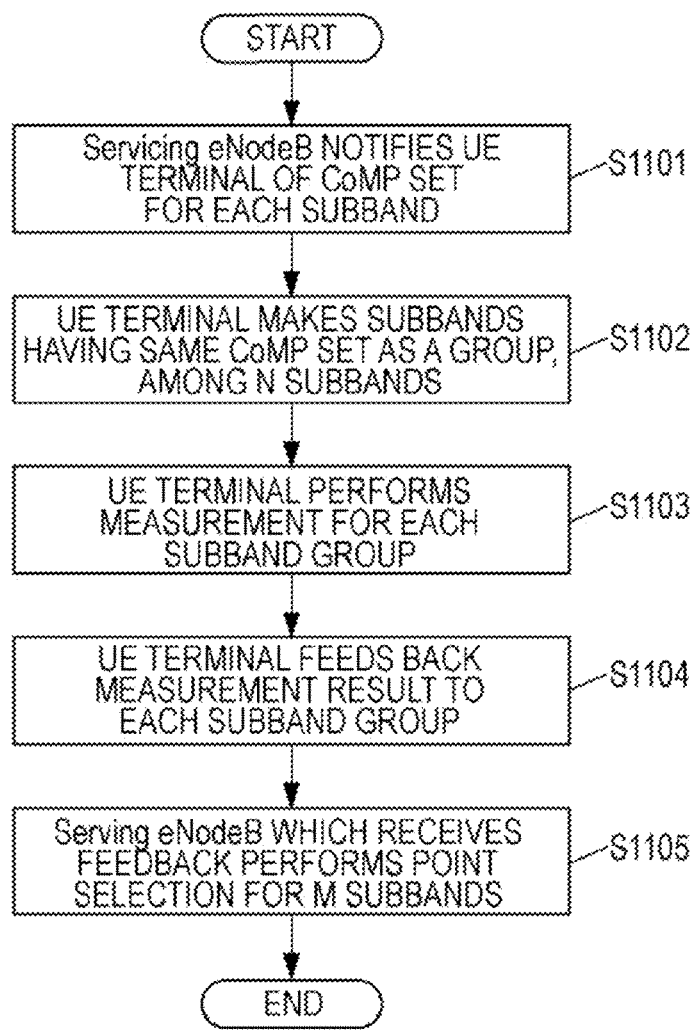
FIG. 11 is a flowchart illustrating a processing procedure in which a UE terminal makes an assembly of subbands which are consecutive in a frequency direction into a group and performs the measurement and the feedback for the point selection in units of subband groups.

FIG. 11 illustrates a processing procedure in a flowchart format in which the UE terminal makes the assembly of the subbands which are consecutive in the frequency direction into a group and performs the measurement and the feedback for the point selection in units of subband groups.

First, the Servicing eNodeB notifies the UE terminal of the CoMP set for the respective subbands (step S1101).

If the UE terminal receives the notification of the CoMP sets for the respective subbands, it makes the assembly of the subbands belonging to the same CoMP set among the whole N subbands into a subband group (step S1102).

Then, the UE terminal performs the measurement for point selection for the respective subbands group (step S1103), and performs the feedback of the measurement result to the respective subbands group (step S1104).

If the Serving eNodeB side receives the feedback from the UE terminal, it performs a point selection on M subbands (step S1105) (however, N≥M).

Third Problem Accompanying Feedback

The UE terminal needs information indicating which eNodeB is currently used to perform CoMP for the respective subbands, in order to perform the feedback of the measurement result for the respective subbands. There is a third problem in which if there is no information of the CoMP set for the respective subbands, the UE terminal is not able to select an effective measurement object for the respective subbands. Further, conveying the information of the CoMP set from the Serving eNodeB to the UE terminal using a signal of a downlink leads to a reduction in a throughput of the downlink due to an increase in the overhead due to the control signal.

Means 3-1 for solving the above third problem includes the Serving eNodeB performing support for selecting an effective measurement object for the respective subbands on the UE terminal side. Specifically, the Serving eNodeB notifies the UE terminal of information for determining a range in which the measurement of point selection for the respective subbands is performed, such as the information regarding the CoMP set for the respective subbands. Since the UE terminal can reduce the processing amount of measurement for point selection for the respective subbands and the information amount to be fed back based on the received information, it is possible to improve the update frequency of point selection while reducing the overhead of the uplink for the point selection, thereby increasing the throughput.

Figure 12:
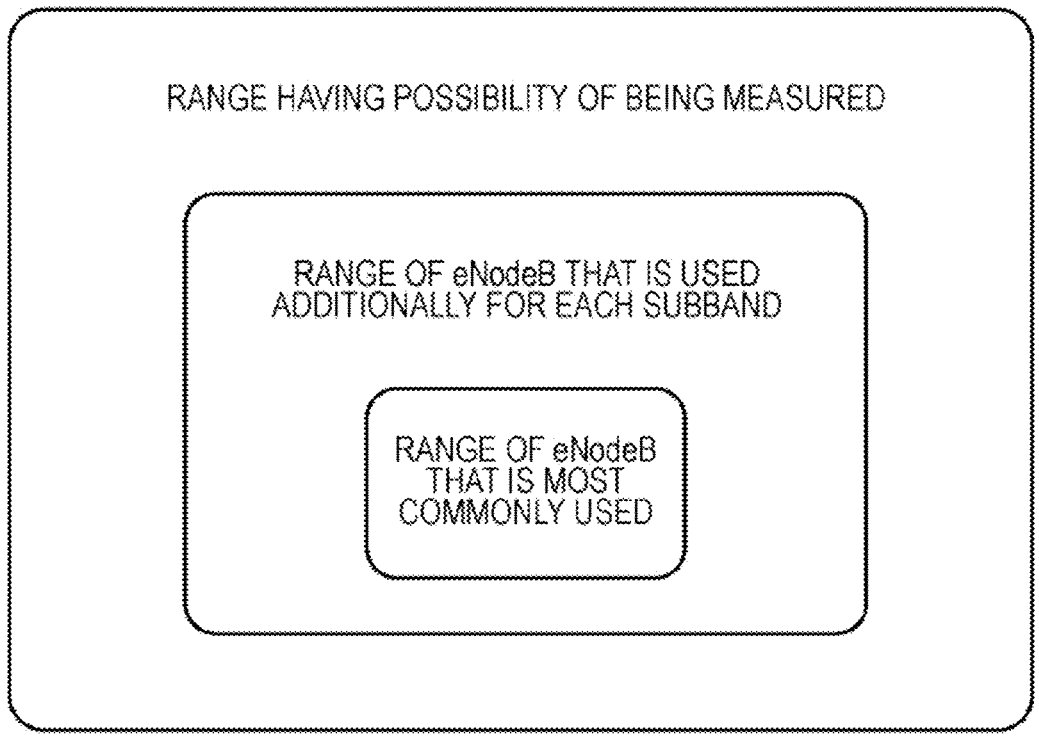
FIG. 12 is a diagram illustrating an aspect in which information notified to a UE terminal by a Serving eNodeB is divided.

The Serving eNodeB provides support for the UE terminal selecting the effective measurement object for the respective subbands, by notifying the UE terminal of the information regarding the CoMP set of the respective subbands. Means 3-2 for solving the above third problem includes dividing information notified to the UE terminal by the Serving eNodeB into three types of information as illustrated in FIG. 12: information indicating a range having a possibility of being measured, information indicating a range that is most commonly used, and information indicating a range of the eNodeB that is used additionally for the respective subbands and notifying the divided information so as to reduce the control signal.

For example, a method of use of the means 3-2 is assumed in which the range having a possibility of being measured is set to have a low update frequency, the most commonly used range is set to have a medium update frequency and the range of the eNodeB additionally used for the respective subbands is set to have a high update frequency.

According to the means 3-2, the set of eNodeBs that are currently used for the respective subbands (that is, CoMP set) is continuously updated, thereby suppressing an increase in the overhead.

For example, the Serving eNodeB may notify information regarding the CoMP set for the respective subbands, using the means 3-1 and 3-2, with respect to the UE terminal which performs the means 2-1, 2-1-1, and 2-1-2.

Apparatus Configuration

Figure 13:
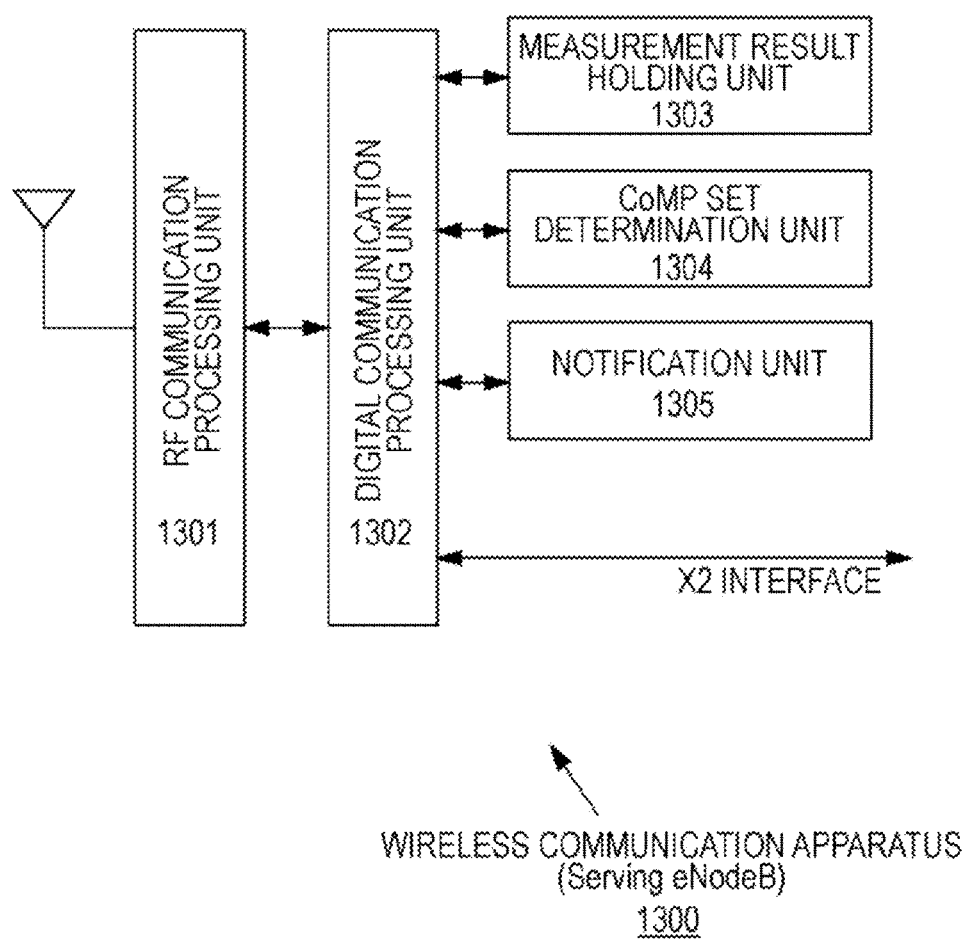
FIG. 13 is a diagram schematically illustrating a configuration example of a wireless communication apparatus 1300 which operates as a Serving eNodeB.

FIG. 13 illustrates a configuration example of a wireless communication apparatus 1300 which operates as the Serving eNodeB (Macro eNodeB) in the wireless communication system (FIG. 1) according to the present embodiment. However, in FIG. 13, the illustration of functional modules which perform basic operations as the Macro eNodeB, such as the management of radio resources within the Macro Cell and the transmission of various reference signals is appropriately omitted.

The wireless communication apparatus 1300 includes an RF communication processing unit 1301 that performs an analog process of wireless signals which are transmitted and received by an antenna and a digital communication processing unit 1302 that performs a modulation process of digital transmission signals and a demodulation process of digital reception signals. The digital communication processing unit 1302 exchanges transmission and reception data with a higher layer protocol of a communication layer of the apparatus 1300 to which it belongs. Further, the digital communication processing unit 1302 communicates with other eNodeBs through an X2 interface, a Serving Gateway (S-GW), and a Mobility Management Entity (MME). Further, the digital communication processing unit 1302 performs a baseband signal process and control of each RRH depending on the apparatus 1300 to which it belongs through the X2 interface.

A measurement result holding unit 1303 stores the measurement results of the wideband and the respective subbands which are fed back in the uplink from each UE terminal present within its own cell.

The CoMP set determination unit 1304 determines the CoMP set of the wideband and the respective subbands for each UE terminal, based on the measurement result of each UE terminal which is stored in the measurement result holding unit 1303.

Since a notification unit 1305 notifies the UE terminal of the information regarding the CoMP set for the respective subbands with respect to respective UE terminals which are present within its own cell, the UE terminal performs support for selecting an effective measurement object for the respective subbands. The means 3-1 is realized by the notification unit 1305 notifying information for determining a range in which the measurement for the point selection in the respective subbands such as information of the CoMP set for the respective subbands is performed. Further, the notification unit 1305 divides information including information notified to the UE terminal into three types of information indicating a range having a possibility of being measured, information indicating a range that is most commonly used, and information indicating a range of the base station that is used additionally for the respective subbands, and notifies the divided information in different update frequency depending on information, thereby realizing the means 3-2.

Figure 14:
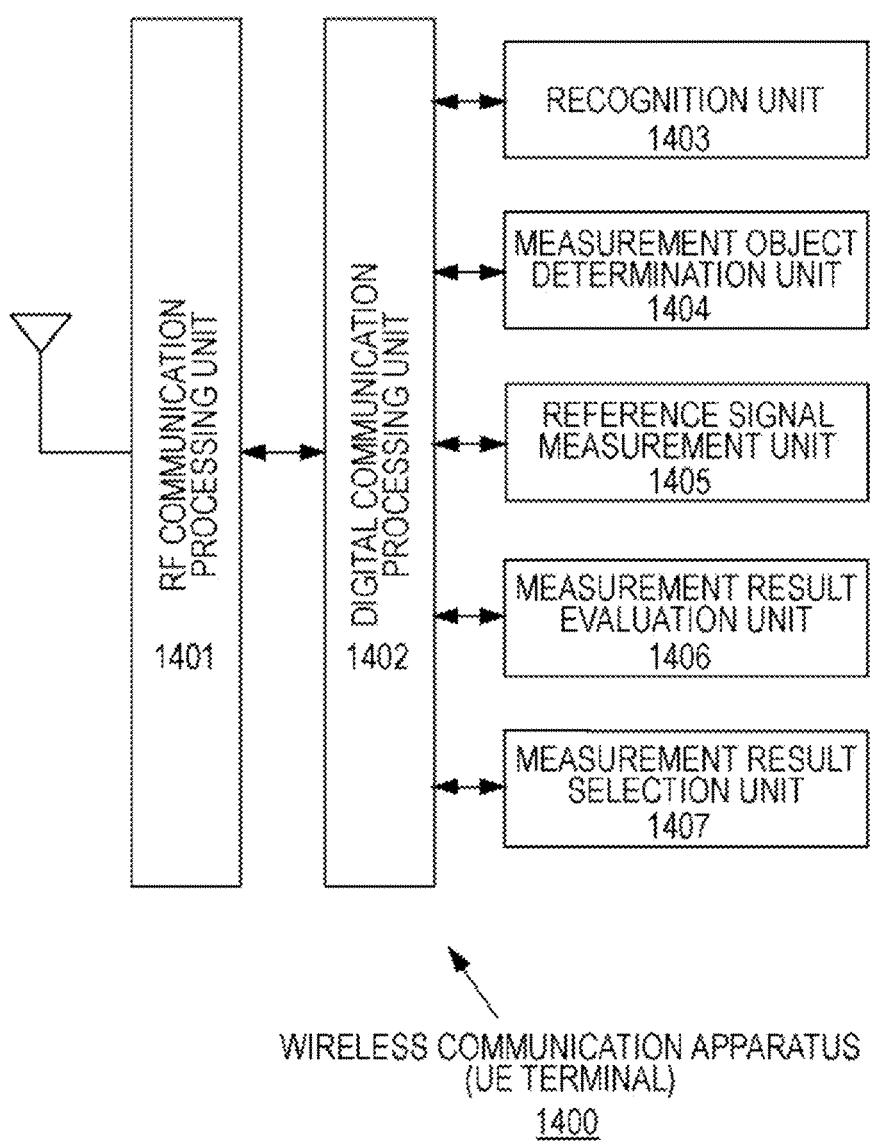
FIG. 14 is a diagram schematically illustrating a configuration example of a wireless communication apparatus 1400 that operates as a UE terminal.

Further, FIG. 14 schematically illustrates a configuration example of a wireless communication apparatus 1400 that operates as a UE terminal, in the wireless communication system (FIG. 1) according to the present embodiment. However, in FIG. 14, the illustration of functional modules which perform basic operations as the UE terminal is appropriately omitted.

The wireless communication apparatus 1400 includes an RF communication processing unit 1401 that performs an analog process of wireless signals which are transmitted and received by an antenna and a digital communication processing unit 1402 that performs a modulation process of digital transmission signals and a demodulation process of digital reception signals. The digital communication processing unit 1402 exchanges transmission and reception data with a higher layer protocol of a communication layer of its own apparatus 1400.

The recognition unit 1403 recognizes a range in which the measurement for point selection is performed in its own apparatus 1400 and information regarding the eNodeB used in the CoMP set for its own apparatus 1400. The recognition unit 1403 can basically recognize the information based on the notification from the Serving eNodeB.

A measurement object determination unit 1404 determines the eNodeB which performs the measurement for the point selection in the respective subbands. The measurement object determination unit 1404 basically selects a base station which is in use as a transmission point of the CoMP or is a candidate for the transmission point as a measurement object. Further, when the means 2-1-1 and 2-1-2 are realized, the measurement object determination unit 1404 predicts which CoMP set is to be determined on the Serving eNodeB side by feeding back the measurement result, and selects the eNodeB which is a measurement object. Further, when the means 2-2 is realized, the measurement object determination unit 1404 makes an assembly of subbands which can be collectively handled into a subband group, and determines the subband group as a measurement object.

A reference signal measurement unit 1405 performs the measurement for point selection, using the CSI-RS from the eNodeB which is selected as a measurement object by the measurement object determination unit 1404, in the respective subbands.

A measurement result evaluation unit 1406 evaluates the measurement result which is measured by the reference signal measurement unit 1405 for the respective subbands. When the means 2-1-1 is realized, the measurement result evaluation unit 1406 evaluates an expected value of an improvement in an SINR of reception by the predicted point selection. Further, when the means 2-1-2 is realized, the measurement result evaluation unit 1406 evaluates the number of useless eNodeBs to be removed from the CoMP set by the predicted point selection.

A measurement result selection unit 1407 selects the measurement result to be fed back to the Serving eNodeB, among the measurement results for the respective subbands measured by the reference signal measurement unit 1405. The selected measurement result is transmitted to the Serving eNodeB through the digital communication processing unit 1402 and the RF communication processing unit 1401.

When the means 1-1 is realized, the measurement result selection unit 1407 selects the measurement result to be fed back for determining the CoMP set such that the set of the measurement results of the base station in the wideband is the population and the set of the measurement results in the respective subbands is a subset for the population.

Further, when the means 1-2 is realized, the measurement result selection unit 1407 selects the measurement results to be fed back for CoMP set determination, so as to include the measurement results of the base stations other than the set of the measurement results in the respective subbands, in addition to the set of the measurement results of the base stations in the wideband. Alternatively, as the derived type, the measurement results to be fed back for determining the CoMP set are selected so as to include the measurement result of the base station which is added to the combination of the base stations of the set of the measurement results in the respective subbands, in addition to the set of the measurement results of the base stations in the wideband.

Alternatively, the measurement result selection unit 1407 selects the measurement result to be fed back to the Serving eNodeB, based on the result obtained by the measurement result evaluation unit 1406 evaluating the measurement results for the respective subbands, which are measured by the reference signal measurement unit 1405. The measurement result selection unit 1407 selects M subbands with poor quality when the means 2-1 is realized. Further, when the means 2-1-1 is realized, the measurement result selection unit 1407 preferentially selects the measurement result of the subband which is evaluated as having a high degree of quality being improved by the feedback by the measurement result evaluation unit 1406. Further, when the means 2-1-2 is realized, the measurement result selection unit 1407 preferentially selects the measurement result of the subband which is evaluated as having a high possibility of useless eNodeBs being removed from the CoMP set by the feedback, by the measurement result evaluation unit 1406.

As described above, according to the present embodiment, when a plurality of subbands obtained by dividing the system frequency are implemented, it is possible to reduce the processing amount measured on the UE terminal side in order to perform the point selection and the information amount to be fed back from the UE terminal to the eNodeB, and thus it is possible to improve the update frequency of point selection while reducing the overhead of the uplink for the point selection, thereby increasing the throughput.

Further, according to the present embodiment, information for the CoMP determining an effective combination can be transmitted from the UE terminal to the eNodeB without an increase in the overhead, and thus it is possible to improve the update frequency of point selection while reducing the overhead of the uplink for the point selection, thereby increasing the throughput.

Further, the technology disclosed in the present specification is able to have following configurations.

(1) A wireless communication apparatus including: a reference signal measurement unit that performs measurement of reference signals transmitted from respective base stations in a wideband and respective subbands, under a communication environment in which an entire system bandwidth is used as the wideband and a plurality of subbands obtained by dividing the system bandwidth are used; a measurement result selection unit that selects measurement results to be fed back in order to determine a cooperative group of the base stations which perform Coordinated Multi Point Transmission/Reception (CoMP) for its own apparatus, among measurement results obtained in the wideband and the respective subbands by the reference signal measurement unit; and a feedback unit that feeds back the measurement results selected by the measurement result selection unit to the base stations.

(2) The wireless communication apparatus according to (1), further including: a measurement object determination unit that selects the base stations which are in use as transmission points of the cooperative group or candidates of the transmission point, as measurement objects, for each wideband and subband, in which the reference signal measurement unit performs measurement of reference signals from the base stations selected by the measurement object determination unit in the wideband and the respective subbands.

(3) The wireless communication apparatus according to (1), in which the measurement result selection unit selects the measurement results to be fed back in order to determine the cooperative group such that a set of measurement results of the base stations in the wideband is a population and a set of measurement results in the respective subbands is a subset for the population.

(4) The wireless communication apparatus according to (1), in which the measurement result selection unit selects the measurement results to be fed back in order to determine the cooperative group, so as to include the measurement results of base stations other than the set of the measurement results in the respective subbands, in addition to the set of the measurement results of the base stations in the wideband.

(5) The wireless communication apparatus according to (1), in which the measurement result selection unit selects the measurement results to be fed back in order to determine the cooperative group, so as to include a measurement result of a base station added to a combination of base stations of the set of the measurement results in the respective subbands, in addition to the set of the measurement results of the base stations in the wideband.

(6) The wireless communication apparatus according to (1), in which the measurement result selection unit preferentially selects the measurement result of the subband having a high possibility of the cooperative group being updated when the measurement result is fed back.

(7) The wireless communication apparatus according to (1), in which the measurement result selection unit preferentially selects the measurement result of the subband having a high possibility of a new base station being added to the cooperative group when the measurement result is fed back.

(8) The wireless communication apparatus according to (1), in which the measurement result selection unit preferentially selects the measurement result of the subband having a high possibility of an unnecessary base station being removed from the cooperative group when the measurement result is fed back.

(9) The wireless communication apparatus according to (1), further including: a measurement result evaluation unit that evaluates the measurement results of the respective subbands by the reference signal measurement unit, in which the measurement result selection unit selects the measurement results of the subbands to be fed back in order to determine the cooperative group, based on evaluation results of the respective subbands by the measurement result evaluation unit.

(10) The wireless communication apparatus according to (9), in which the measurement result evaluation unit evaluates a quality of the respective subbands, and in which the measurement result selection unit selects measurement results of a predetermined number of subbands to be fed back, so as to include measurement results of a predetermined number of subbands with poor quality.

(11) The wireless communication apparatus according to (9), in which the measurement result evaluation unit predicts an expected value of an improvement in quality for the respective subbands by the cooperative group being updated when measurement results are fed back, and in which the measurement result selection unit selects measurement results of a predetermined number of subbands to be fed back, based on the predicted expected value.

(12) The wireless communication apparatus according to (11), further including: a measurement object determination unit that predicts which cooperative group is to be determined by feeding back measurement results and selects a base station which is a measurement object by the reference signal measurement unit based on the predicted result, for the respective subbands, in which the measurement result evaluation unit predicts an expected value of an improvement in quality due to the predicted cooperative group.

(13) The wireless communication apparatus according to (9), in which the measurement result evaluation unit evaluates whether or not an unnecessary base station is to be removed from the cooperative group when measurement results are fed back for the respective subbands, and in which the measurement result selection unit selects measurement results of a predetermined number of subbands to be fed back, based on a possibility of the unnecessary base station being removed.

(14) The wireless communication apparatus according to (13), further including: a measurement object determination unit that predicts which cooperative group is to be determined by feeding back the measurement results and selects the base station which is the measurement object by the reference signal measurement unit based on the predicted result, for the respective subbands, in which the measurement result evaluation unit evaluates how many useless base stations are to be removed by the predicted cooperative group.

(15) The wireless communication apparatus according to (1), in which the measurement result selection unit selects the measurement results such that an assembly of subbands which are consecutive in the frequency direction and have the same combination of the base stations constituting the cooperative group is made into a subband group and is fed back in units of subband groups.

(16) A wireless communication apparatus including: a notification unit that notifies a terminal station of information for determining a range for performing measurement and feedback of reference signals transmitted from respective base stations, under a communication environment in which an entire system bandwidth is used as a wideband and a plurality of subbands obtained by dividing the system bandwidth are used; and a cooperative group determination unit that determines a cooperative group of base stations which performs CoMP for the terminal station in a wideband and the respective subbands, based on information which is fed back from the terminal station.

(17) The wireless communication apparatus according to (16), in which the notification unit notifies the terminal station of information regarding the cooperative group which is determined by the cooperative group determination unit for the respective subbands.

(18) The wireless communication apparatus according to (16), in which the notification unit divides information notified to the terminal station into three types of information indicating a range having a possibility of being measured, information indicating a range which is used most widely, and information indicating a range of a base station which is additionally used for the respective subbands, and notifies the information in different update frequencies for each piece of information.

(19) A wireless communication method including: a reference signal measurement step of performing measurement of reference signals transmitted from respective base stations, in a wideband and respective subbands, under a communication environment in which an entire system bandwidth is used as the wideband and a plurality of subbands obtained by dividing the system bandwidth are used; a measurement result selection step of selecting measurement results to be fed back in order to determine a cooperative group of base stations which performs CoMP for its own apparatus, among measurement results obtained in the wideband and the respective subbands by the reference signal measurement step; and a feedback step of feeding back the measurement results selected in the measurement result selection step to the base station.

(20) The wireless communication method according to (19), in which in the measurement result selection step, the measurement results to be fed back in order to determine the cooperative group such that a set of measurement results of the base stations in the wideband is a population and a set of measurement results in the respective subbands is a subset for the population.

(21) The wireless communication method according to (19), in which in the measurement result selection step, the measurement results to be fed back in order to determine the cooperative group are selected, so as to include the measurement results of the base stations other than the set of the measurement results in the respective subbands, in addition to the set of the measurement results of the base stations in the wideband.

(22) The wireless communication method according to (19), in which in the measurement result selection step, the measurement results to be fed back in order to determine the cooperative group are selected, so as to include the measurement result of a base station added to a combination of base stations of the set of the measurement results in the respective subbands, in addition to the set of the measurement results of the base stations in the wideband.

(23) The wireless communication method according to (19), further including: a measurement result evaluation step of evaluating the measurement results of the respective subbands in the reference signal measurement step, in which in the measurement result selection step, the measurement result of the subband to be fed back in order to determine the cooperative group is selected, based on evaluation results of the respective subbands in the measurement result evaluation step.

(24) The wireless communication method according to (23), in which in the measurement result evaluation step, a quality of the respective subbands is evaluated, and in which in the measurement result selection step, measurement results of a predetermined number of subbands to be fed back are selected so as to include measurement results of a predetermined number of subbands with poor quality.

(25) The wireless communication method according to (23), in which in the measurement result evaluation step, an expected value of an improvement in quality for the respective subbands by the cooperative group being updated when a measurement result is fed back is predicted, and in which in the measurement result selection step, measurement results of a predetermined number of subbands to be fed back are selected, based on the predicted expected values.

(26) The wireless communication method according to (23), in which in the measurement result evaluation step, whether or not an unnecessary base station is to be removed from the cooperative group when measurement results are fed back for the respective subbands is evaluated, and in which in the measurement result selection step, measurement results of a predetermined number of subbands to be fed back are selected, based on a possibility of the unnecessary base station being removed.

(27) The wireless communication method according to (19), in which in the measurement result selection step, the measurement results are selected such that an assembly of subbands which are consecutive in the frequency direction and have the same combination of the base stations constituting the cooperative group is made into a subband group and is fed back in units of subband groups.

(28) A wireless communication method including: a notification step of notifying a terminal station of information for determining a range for performing measurement and feedback of reference signals transmitted from respective base stations, under a communication environment in which an entire system bandwidth is used as a wideband and a plurality of subbands obtained by dividing the system bandwidth are used; and a cooperative group determination step of determining a cooperative group of base stations which performs CoMP for the terminal station in a wideband and the respective subbands, based on information which is fed back from the terminal station.

(29) The wireless communication method according to (28), in the notification step, information notified to the terminal station is divided into three types of information indicating a range having a possibility of being measured, information indicating a range which is used most widely, and information indicating a range of a base station which is additionally used for the respective subbands, the information is notified in different update frequencies for each piece of information.

(30) A wireless communication system including: a plurality of base stations that transmit reference signals; and a terminal station that receives the reference signals from the base stations and performs measurement for determination of a cooperative group which performs CoMP for its own station, in which the terminal station performs measurement of the reference signals transmitted from respective base stations in a wideband and respective subbands, under a communication environment in which an entire system bandwidth is used as the wideband and a plurality of subbands obtained by dividing the system bandwidth are used, and selects and feeds back measurement results necessary for determining a cooperative group of the base stations which performs CoMP for its own apparatus.

(31) a wireless communication system including: a plurality of base stations that transmit reference signals; and a terminal station that receives the reference signals from the base stations and performs measurement and feedback for determination of a cooperative group of the base stations which performs CoMP for its own station, in which at least one base station notifies the terminal station of information for determining a range for performing the measurement and the feedback of the reference signals transmitted from respective base stations, under a communication environment in which an entire system bandwidth is used as a wideband and a plurality of subbands obtained by dividing the system bandwidth are used.

INDUSTRIAL APPLICABILITY

The foregoing has described in detail the technology disclosed in the present specification with reference to specific embodiments. However, it will be obvious that those skilled in the art can modify and replace the exemplary embodiments without departing from the scope of the technology disclosed in the present specification.

In the present specification, a description has been made focusing on the embodiment applied to a cellular communication system according to LTE developed by 3GPP, but the scope of the technology disclosed in the present specification is not limited thereto. It is possible to apply similarly the technology disclosed in the present specification to various cellular communication systems to which the technology of a plurality of base stations in cooperation with each other transmitting and receiving data at the same time to a terminal station is applied.

In short, the technologies disclosed in the present specification have been described by way of exemplary embodiments and the content described in the present specification is not construed as being limited. In order to determine the scope of the technology disclosed in the present specification, the appended claims should be referred to.

REFERENCE SIGNS LIST

1300 WIRELESS COMMUNICATION APPARATUS (SERVING eNodeB)
1301 RF COMMUNICATION PROCESSING UNIT
1302 DIGITAL COMMUNICATION PROCESSING UNIT
1303 MEASUREMENT RESULT HOLDING UNIT
1304 CoMP SET DETERMINATION UNIT
1305 NOTIFICATION UNIT
1400 WIRELESS COMMUNICATION APPARATUS (UE TERMINAL)
1401 RF COMMUNICATION PROCESSING UNIT
1402 DIGITAL COMMUNICATION PROCESSING UNIT
1403 RECOGNITION UNIT
1404 MEASUREMENT OBJECT DETERMINATION UNIT
1405 REFERENCE SIGNAL MEASUREMENT UNIT
1406 MEASUREMENT RESULT EVALUATION UNIT
1407 MEASUREMENT RESULT SELECTION UNIT

The invention claimed is:

1. A wireless communication apparatus comprising:
a reference signal measurement unit that performs measurement of reference signals transmitted from respective base stations in a wideband and respective subbands, under a communication environment in which an entire system bandwidth is used as the wideband and a plurality of subbands obtained by dividing the system bandwidth are used;
a measurement result selection unit that selects measurement results to be fed back in order to determine a cooperative group of the base stations which performs Coordinated Multi Point Transmission/Reception (CoMP) for its own apparatus, among measurement results obtained in the wideband and the respective subbands by the reference signal measurement unit; and
a feedback unit that feeds back the measurement results selected by the measurement result selection unit to the base station,
wherein the measurement result selection unit selects the measurement results to be fed back in order to determine the cooperative group, so as to include the measurement results of base stations other than the set of the measurement results in the respective subbands, in addition to the set of the measurement results of the base station in the wideband.

2. A wireless communication apparatus comprising:
a reference signal measurement unit that performs measurement of reference signals transmitted from respective base stations in a wideband and respective subbands, under a communication environment in which an entire system bandwidth is used as the wideband and a plurality of subbands obtained by dividing the system bandwidth are used;
a measurement result selection unit that selects measurement results to be fed back in order to determine a cooperative group of the base stations which performs Coordinated Multi Point Transmission/Reception (CoMP) for its own apparatus, among measurement results obtained in the wideband and the respective subbands by the reference signal measurement unit; and a feedback unit that feeds back the measurement results selected by the measurement result selection unit to the base station, the measurement result selection unit being configured to select the measurement results for feedback which avoid one or more predetermined feedback problems, wherein the measurement result selection unit selects the measurement results such that an assembly of subbands which are consecutive in the frequency direction and have the same combination of the base stations constituting the cooperative group is made into a subband group and is fed back in units of subband groups.

3. A wireless communication apparatus comprising:

a notification unit that notifies a terminal station of information for determining a range for performing measurement and feedback of reference signals transmitted from respective base stations, under a communication environment in which an entire system bandwidth is used as a wideband and a plurality of subbands obtained by dividing the system bandwidth are used; and a cooperative group determination unit that determines a cooperative group of base stations which performs CoMP for the terminal station in a wideband and the respective subbands, based on information which is fed back from the terminal station, wherein the notification unit divides information notified to the terminal station into three types of information indicating a range having a possibility of being measured, information indicating a range which is used most widely, and information indicating a range of a base station which is additionally used for the respective subbands, and notifies the information in different update frequencies for each piece of information.

4. A wireless communication method comprising:

a notification step of notifying a terminal station of information for determining a range for performing measurement and feedback of reference signals transmitted from respective base stations, under a communication environment in which an entire system bandwidth is used as a wideband and a plurality of subbands obtained by dividing the system bandwidth are used; and a cooperative group determination step of determining a cooperative group of base stations which performs CoMP for the terminal station in a wideband and the respective subbands, based on information which is fed back from the terminal station, wherein the notification step includes dividing information notified to the terminal station into three types of information indicating a range having a possibility of being measured, information indicating a range which is used most widely, and information indicating a range of a base station which is additionally used for the respective subbands, and notifying the information in different update frequencies for each piece of information.

* * * * *